(12) United States Patent
Gierer et al.

(10) Patent No.: US 7,736,270 B2
(45) Date of Patent: Jun. 15, 2010

(54) CONTROL VALVE ARRANGEMENT FOR CONTROLLING A START CLUTCH OF AN AUTOMATIC GEARBOX

(75) Inventors: Georg Gierer, Kressbronn (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 705 days.

(21) Appl. No.: 11/587,885

(22) PCT Filed: Apr. 22, 2005

(86) PCT No.: PCT/EP2005/004352

§ 371 (c)(1),
(2), (4) Date: Mar. 29, 2007

(87) PCT Pub. No.: WO2005/106291

PCT Pub. Date: Nov. 10, 2005

(65) Prior Publication Data

US 2008/0047795 A1    Feb. 28, 2008

(30) Foreign Application Priority Data

Apr. 27, 2004   (DE) .................. 10 2004 020 569

(51) Int. Cl.
  *B60W 10/02* (2006.01)
  *F16H 61/26* (2006.01)
(52) U.S. Cl. .................. 477/175; 477/159; 477/906
(58) Field of Classification Search ............... 477/174, 477/175, 180, 125, 158, 159, 906; 475/119, 475/120

See application file for complete search history.

(56) References Cited

U.S. PATENT DOCUMENTS 4,296,652 A * 10/1981 Oberpichler et al. ........ 477/159
4,345,489 A *  8/1982 Muller et al. ................ 475/64

(Continued)

FOREIGN PATENT DOCUMENTS

BE            1009149        12/1996

(Continued)

*Primary Examiner*—Roger Pang
(74) *Attorney, Agent, or Firm*—Davis & Bujold, P.L.L.C.

(57) ABSTRACT

A control valve arrangement for controlling a start coupling of an automatic gearbox comprising a clutch control valve (3, 37, 41, 48, 49) for controlling at least one clutch actuating device (4, 40) which, during normal operation of the gearbox, converts a supply pressure input ($P\_V1$, $P\_V2$) into a clutch actuation pressure ($P\_K$, $P\_K1$, $P\_K2$) according to a pre-control pressure or an electric pre-control signal in order to control the clutch actuation device. An activating pressure ($P\_A$) can be supplied to the clutch control valve or directly to the clutch activation device in the event of a discontinuation of the pre-control pressure or pre-control signal according to the engine and gearbox output speed, whereupon the clutch actuation device is maintained in a closed position as long as the above mentioned speed remains above a predetermined limit.

26 Claims, 9 Drawing Sheets

U.S. PATENT DOCUMENTS

| | | | |
|---|---|---|---|
| 5,263,387 A * | 11/1993 | Reniers | 474/28 |
| 5,314,385 A | 5/1994 | Haley et al. | |
| 5,787,710 A | 8/1998 | Baeuerle | |
| 6,102,176 A | 8/2000 | Fujikawa | |
| 6,155,396 A | 12/2000 | Tsubata et al. | |
| 6,467,262 B1 | 10/2002 | Baeuerle | |
| 6,702,702 B2 * | 3/2004 | Godecke | 475/132 |
| 6,865,965 B2 | 3/2005 | Uchino | |
| 7,044,889 B2 | 5/2006 | Habeck | |
| 2005/0043141 A1 | 2/2005 | Neuner | |
| 2005/0202917 A1 * | 9/2005 | Shimizu et al. | 475/120 |
| 2008/0234099 A1 * | 9/2008 | Gierer et al. | 477/79 |
| 2008/0234100 A1 * | 9/2008 | Gierer et al. | 477/80 |
| 2009/0036269 A1 * | 2/2009 | Kim | 477/174 |
| 2010/0056334 A1 * | 3/2010 | Toi et al. | 477/158 |

FOREIGN PATENT DOCUMENTS

| | | |
|---|---|---|
| DE | 198 20 389 A1 | 11/1998 |
| DE | 199 43 939 A1 | 3/2001 |
| DE | 101 18 756 A1 | 5/2002 |
| DE | 101 59 640 A1 | 6/2003 |
| DE | 102 30 774 A1 | 1/2004 |
| DE | 102 38 104 A1 | 3/2004 |
| EP | 0 487 128 A1 | 5/1992 |
| EP | 0 942 202 A2 | 9/1999 |
| EP | 0 982 512 A2 | 3/2000 |
| EP | 1 251 300 A2 | 10/2002 |
| EP | 1 517 059 A1 | 3/2005 |
| EP | 1 519 080 A1 | 3/2005 |
| EP | 1 522 754 A1 | 4/2005 |

* cited by examiner

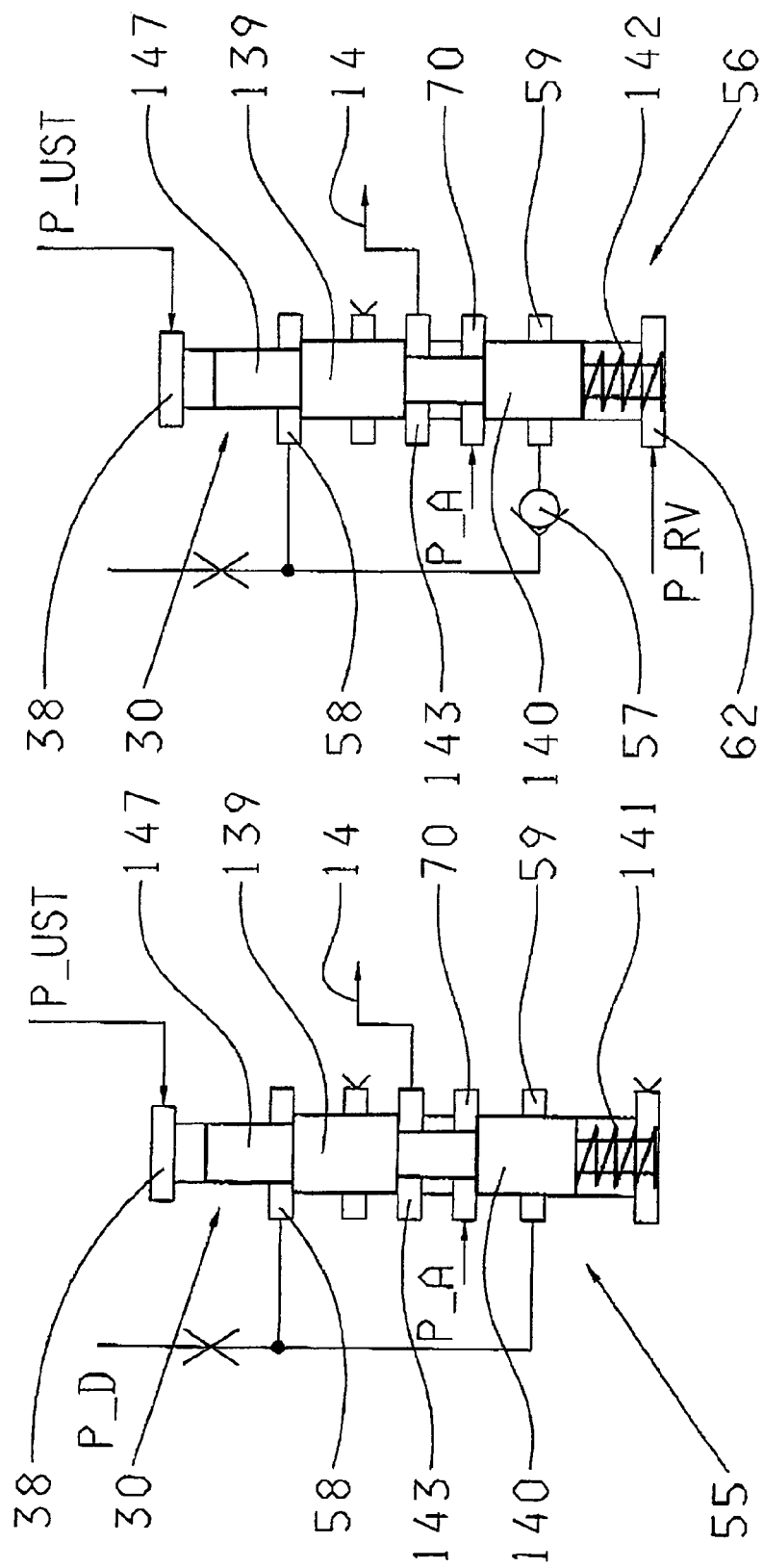

CONTROL VALVE ARRANGEMENT FOR CONTROLLING A START CLUTCH OF AN AUTOMATIC GEARBOX

This application is a national stage completion of PCT/EP2005/004352 filed Apr. 22, 2005, which claims priority from German Application Serial No. 10 2004 020 569.8 filed Apr. 27, 2004.

FIELD OF THE INVENTION

The invention concerns a control valve arrangement for the control of a start clutch of an automatic transmission of a motor vehicle.

BACKGROUND OF THE INVENTION

In automatic transmissions with automated, wet start clutches, the general practice is to convert a typical mechanical transmission into an emergency operation, for example if following the failure of a transmission control apparatus, which alleviates the failure of power in a transmission in such a manner the start clutch, now unpowered, is caused to disengaging. Especially, in a case of driving in heavy traffic, this strategy can lead to serious results, since the vehicle has become capable of no more than a powerless, forward rolling behavior.

Engagement of the wet start clutch in such a condition of driving, because of technological safety reasons, is also impossible since the shutdown of power remains in force only because of a hydraulic clutch activation pressure. Insofar as the vehicle's drive motor stalls itself upon the diminution of the travel velocity with the engaged clutch, there is still a low residual speed at which the important motor driven co-acting aggregates, such as brake action reinforcement or power steering pumping can no longer properly function.

In a typical automatic transmission with a dry start clutch, during mechanical emergency operation, the clutch is engaged so that the output torque of the vehicle remains in a technological connection with the motor output until the vehicle comes to a standstill. In such a case, it is true that no dangerous, critical conditions of driving exist for the vehicle although, following the standstill, the vehicle can no longer be brought into motion or even pushed into a safer location.

In accordance with the foregoing, obviously there exists a need for a control apparatus for a start clutch of an automatic transmission of a motor vehicle which, in dependency upon the speed of rotation of the motor and/or the speed of rotation of the output drive of the transmission, the power flow in the drive string is first interrupted when a predetermined threshold speed of rotation of the motor and/or transmission output speed of rotation is understepped. In this way, no stalling of the motor of the vehicle occurs, the auxiliary aggregates remain operable and the driver is still given the advantage of removing himself and his vehicle from a possibly dangerous driving zone. Additionally by way of such a control system, even an induced movement of the vehicle, which is then in standstill, is possible since an otherwise movement blocking, power-flow connection between the motor and the transmission is broken.

Based on this background, DE 199 43 939 A1 discloses a hydraulic emergency control for a stepless transmission, wherein a dedicated clutch to the transmission becomes separable and engagable according to the speed of rotation of the vehicle motor. Thereby, in the case of a disturbance, a renewed stalling of the drive motor can be avoided upon the understepping of a defined threshold value of rotation speed and as well, a startup upon the overstepping of the threshold is enabled. According to the design of the emergency control, the possibility exists that the speed of rotation related signal can be engendered, for example as (1) a hydraulic pressure, as (2) a pneumatic pressure or as (3) an electrical voltage; any one of which can be functional.

Additionally, DE 102 38 104 A1 teaches a procedure for controlling an emergency shifting program for an automatic transmission with a start clutch, which is particularly designed to allow a realization of an emergency operation upon the standstill of the vehicle, as well as permitting a by-pass of the lowering of the speed of rotation of the motor to a point below the stalling threshold. In the case of this procedure, provision has been made that the emergency shifting program is controlled by a signal related to the vehicle travel speed and/or to the speed of rotation of the motor, which is computer processed by valve-logic and acts in such a manner that the motor operation is interrupted only in the compression stage in order to prevent the motor from stalling.

Accordingly, the purpose of the invention is the creation of a control valve arrangement for controlling of a start clutch of an automatic transmission where, during an emergency control operation, the start clutch can be disengaged if the speed of rotation of the motor and/or the output speed of rotation of the transmission, i.e., the travel speed of the vehicle, falls below a predetermined threshold value. The purpose encompasses the fact that this valve arrangement is to be economical in manufacturing costs, simple in design and reliable under emergency conditions.

SUMMARY OF THE INVENTION

The invention is based on a control valve arrangement for controlling a starting clutch of an automatic transmission, where a clutch control valve for controlling at least one clutch activation apparatus which, in the normal operation of the transmission, diverts a provided source of pressure to the direct control of the clutch activation apparatus and does so in relation to a pilot pressure or to an electrical signal.

Additionally, this control valve arrangement is for the realization of an emergency operation of the transmission. Upon the failure of pilot pressure or electrical signal, an activation pressure can be conducted to the clutch control valve, whereby this valve is held in its engaged position as long as a specified speed of rotation lies above a predetermined speed of rotation threshold. The pilot alarms can be induced by the following, individually or in common: motor speed of rotation; transmission output speed of rotation; motor torque; transmission input torque; transmission input speed of rotation; transmission output torque, and the driving load.

By way of this valve arrangement, a control apparatus for emergency operation of a vehicle with an automatic transmission can be created, which can be manufactured at low cost and is reliable in its function. The control apparatus would be activated, for example if an electronic transmission control system and/or an electrically controlled clutch control valve dropped out of service. A controlling pressure, which would be related to the speed of rotation of the vehicle's driving motor and/or to the transmission output speed of rotation, would provide assurance that a start clutch of the automatic transmission remains operative for the transfer of torque through the automatic transmission as long as the driving speed and the speed of rotation of the drive motor do not fall below such a stalling speed of rotation that the driving motor would lose its internal combustion process.

Insofar as the driving speed, during such an emergency operation, actually drops below such a functional value with an engaged start clutch, the driver would be obliged to contend with stalling of the motor, the control pressure, which is related to the speed of rotation, disengages the start clutch. This start clutch, up to this time, has been transferring the full motor torque. Stalling of the motor is thereby avoided, so that important vehicle components, such as a brake pressure reinforcing way and/or a power steering auxiliary pump, can also be continuously operated.

In the embodiment of these principles of the invention, the proposal is made that the activation pressure of a self-operating pressure, retention valve can be conducted directly to the clutch activation apparatus by way of an activation valve leading to a clutch control valve, or alternately through a bypass, if available, directly to the clutch activation apparatus. This would take place if a speed of rotation dependent control pressure is applied to the self-activating check valve and this pressure is greater than the applicable pressure threshold value. As this occurs, this pressure threshold value characterizes that the previously mentioned motor speed of rotation, below which the motor will stall.

According to another component of such a control valve arrangement, provision has been made that a pilot pressure in normal operation, can be exerted on the self-activating check valve and on the activation valve. Deviating therefrom, provision can also be made to the effect that, first, at the self-activating, pressure retention valve and, second, at the activation valve during normal operation, the control pressure, which defines the normal operation or yet, third, during emergency operation at the activation valve, a control pressure is established which defines the emergency operation.

With regard to the advantageous clutch control valve, notice should be given that it is possible to design this valve, which is capable of governing the pressure means or, in some embodiments, activating a solenoid operator. The defined chosen mode of construction for the self-operating pressure, retention valve is, however, not of decisive importance for the result to be achieved by the invention.

A pilot pressure controlled clutch control valve advantageously incorporates two axial, successively placed slide valves which, as is the case with all other slide valves here described, are advantageously inserted into a slide valve body of a hydraulic transmission control apparatus to move with axial motion thereby aligning complementary flow ports.

Belonging to the two slide valves of the pilot pressure controlled clutch control valve, in accord with an advantageous embodiment example, is to be found a shorter slide valve which, on its oppositely situated end surface is pressure-loaded by activation pressure, that is to say, by the pilot pressure, while the pilot pressure can be applied against an axial end face of a longer slide valve.

According to another embodiment of the control valve arrangement, the slide valve of the activation valve can be subjected to the activation pressure and to the pilot pressure. In addition, provision has been made that the slide valve of the self-operating pressure, retention valve can accept activation and pilot pressures.

Beyond this, it is a characterization of a control valve arrangement of invented design in that the slide valve of the self-operating pressure, retention valve and the slide valve of the activation valve exhibit on a first axial end, respectively, a control piston against which a reset spring abuts, while the pilot pressure can act upon that second axial end of a control piston, which is remote from the reset spring.

In a circumstance when pilot pressure fails and a pressure based on speed of rotation exists, which lies below the specified threshold value by way of the above measures, assurance is given that the slide valve of the self-operating pressure, retention valve is pushed so far axially by a reset spring that even a renewed increase of the speed of rotation related pressure is no longer enabled to close the start clutch. From a technological standpoint of safety, this is of exceptional value since the vehicle drive-motor is now in a state of standstill with the start clutch necessarily open. In this operation, the motor, for example, for trial, could be run up to a high rate without the danger that thereby an undesired start of the vehicle would result.

Further, it could be seen as advantageous if the axial end faces of both slide valves located in the pilot pressure controlled, clutch control valve are subjected to the mentioned pilot pressure. In this condition, provision is made in that the end surface, which is remote from the end surface loaded with the pilot pressure, of the axially longer slide valve of the clutch control valve be subjected to the force of a reset spring.

A typical reset spring abuts itself on a piston of the axially longer slide valve of the clutch control valve in such a manner that both end faces of the piston can be loaded by the controlled clutch activation pressure.

In the case of an activation valve, the co-acting reset spring provides assurance that, by a defection of the pilot pressure of the slide valve of this valve, without any auxiliary support, the piston of the valve is pushed into that position where the provided activation pressure from the self-operating pressure, retention valve can be conducted through the clutch control valve, which is now activated by pilot pressure.

Considering the clutch activation apparatus, it is preferable that this apparatus possess an operative piston in a cylinder, which the piston receives force from an axially aligned, piston-encompassing reset spring. By way of this construction, upon a defection of the pilot pressure, that is to say, upon the failure of another control pressure or a dropout of an electric operative signal, as well as entering a lower state of a control pressure based on speed of rotation, this piston would be so far retracted in its cylinder that a clutch, which has previously been disengaged within the circumstances of emergency operation, remains in the same disengaged state.

A further embodiment of the invention provides, that the supply pressure, which is delivered to the clutch control valve, possesses the same level of pressure as the activation pressure. If this is the case, it becomes advantageously possible that, first, the same pressure source is being relied upon and, second, the start clutch will be subjected to the same slip-free, clutch-engaging force as is conventionally used in normal operation when the activation pressure is conducted directly (possibly bypassing a clutch control valve) to the clutch activation apparatus.

In this connection, mention is made that according to another embodiment of the invention, provision could be made so that the activation pressure can be acquired from that very high pressure hydraulic fluid flow, which is employed in normal operation for the clutch slip operation of at least one start clutch.

Since it can be advantageous that the described self-restraining, operational function of the control valve arrangement acts to prevent a shifted-into, reverse vehicle travel, another embodiment of the invention prevents the enablement of the transmission from performing the reverse travel during an emergency operation.

For the realization of this controlling function, another provision can be that the end-face of a piston of a slide valve, which piston forms an abutment for the reset spring of the self-operating pressure, retention valve, is loaded with a reversal-prevention pressure, the degree of which pressure is so selected that, in spite of the control pressure, dependent on speed of rotation, exerted on this self-operating pressure, retention valve, any forwarding of the activation pressure is prevented. At the same time, since the pilot pressure or the electrical control signal is no longer being applied on the clutch control valve then, in the emergency operational state in a case of shifted-into reverse travel, the start clutch is disengaged by way of the clutch activation apparatus by the action of the force of the assigned reset spring.

A special embodiment of an invented design for the control valve arrangement provides that, in normal operation of the transmission, a separate control signal, i.e., a separate control pressure for the activation of the activation valve as well as the self-operating pressure, retention valve is employed, while only the clutch control valve is loaded by the pilot pressure.

According to this embodiment, it is possible that a conduction of pressure can only be directed against that end face, which is remote from the reset spring of the axially longer, slide valve as well as against the opposite end face of the shorter slide valve of the clutch control valve. Moreover, the self-operating pressure, retention valve as well as the activation valve on their ends, which are remote from the reset springs, are pressurized by that control pressure which is characteristic of normal operation of the transmission. In a case of a defection of this control pressure for realization of the transmission emergency operation, a switching of the activation pressure onto the clutch control valve is possible. Thereby the clutch activation apparatus, upon the defection of the pilot pressure, will be held in its engaged position until the speed of rotation related, control pressure at the self-operating pressure, retention valve drops below the preselected pressure threshold value.

Another embodiment of the control valve arrangement provides that the clutch control valve and the self-operating pressure, retention valve can be subjected to the pilot pressure, while the activation valve is loaded with a converted starting pressure, which acts upon the reset spring-loaded end of the slide valve of this valve.

Accordingly, provision is made so that pilot pressure can be applied against that end face, which is remote from the reset spring, of the slide valve of the self-operating pressure, retention valve and to that end face, which is remote from the reset spring of the longer slide valve of the clutch control valve and so that activation pressure can be applied against that end which is remote from the reset spring of the slide valve of the activation valve, as well as a pressure chamber of the activation valve, so that an emergency control pressure can be applied against the end face, which is subjected to the force of the reset spring of the slide valve of the activation valve to bring about the release of an emergency operation of the transmission and so that activation pressure from the activation valve can be diverted to the clutch control valve following a defection of the pilot pressure.

By way of this construction mode, the clutch activation apparatus is held in its engaged position until the speed of rotation related control pressure at the self-operating pressure, retention valve drops below the predetermined threshold of level of pressure.

The invention does not limit itself to the activation arrangement for the start clutch. Thus a provision is possible that with the control valve arrangement in accordance with the invention, two mutually separate, controllable start clutches can be present in an emergency operation of the transmission. In the described case which follows during the emergency operation of the transmission, one of the two start clutches is held just so long in its engaged position until the speed of rotation control pressure lies above the specified pressure threshold.

Thus a control valve arrangement is provided wherein a first pilot pressure of that end surface, which is remote from the reset spring of a spring-loaded, slide valve of a first clutch control valve and a second pilot pressure of that end surface which is remote from the reset spring of a spring-loaded, slide valve of a second clutch control valve, allow both respective clutch control valves to exert pressure upon one of two clutch activation apparatuses with respective one clutch activation pressure and where the two pilot pressures can be directed to one switchover valve by way of which that end surface, which is remote from the reset spring of the slide valve of the activation valve and of the self-operating pressure, retention valve are alternatingly subjected to the higher of the two pilot pressures.

In accordance with the failure of the pilot pressure, as well as in the presence of a sufficiently high speed of rotation related control pressure on the self-operating pressure, retention valve, the activation pressure from the self-operating pressure, retention valve can be forwarded to a selection valve, by way of which and dependent upon its set position, this pressure can be again forwarded to that end face, which is remote from the reset spring of the shorter slide valve of the first clutch control valve or to that end face, which is remote from the reset spring of the shorter slide valve of the second clutch control valve.

Thereby a clutch activation apparatus is held in its engaged position until the speed of rotation control pressure understeps the predetermined pressure threshold, while the second clutch activation apparatus is brought into an open-position or, if already open, is continued to be held in that position.

In the case of such a control valve arrangement, it is possible that provision can be additionally made, to the effect that the reset remote end face of the slide valve in the selection valve can be subjected to the regulated clutch activation pressure of the first clutch control valve so that, under this circumstance, if this controlled clutch activation pressure understeps a predetermined pressure value then the slide valve of the selection valve can be brought into its axial second position in which the activation pressure from this selection valve is directed to that end face, which is remote from the reset spring of the shorter slide valve of the second clutch control valve.

Accordingly, the shorter slide valve acts upon that end face, which is remote from the reset spring of the spring-loaded slide valve of this second clutch control valve so that a supply pressure is delivered as a clutch activation pressure to the emergency operational positioning, i.e., holding, of the second clutch activation apparatus in the direction of closure of the same.

Another embodiment of a control valve arrangement, designed according to the invention, emphasizes the actual control function. This is carried out in that two respective clutch activation apparatuses can act upon one of two start clutches where, for the realization of an emergency operation of the transmission that actuation apparatus, i.e., that clutch would be retained in its engaged position, which clutch has been already activated in the engaged direction.

Provision is made for a control valve arrangement, where a first pilot pressure against that end face, which is remote from the reset spring of the spring-loaded slide valve of a first clutch control valve, as well as a second pilot pressure against that end face, which is remote from a reset spring of a spring-loaded slide valve can be so forwarded, that the two clutch control valves subject one of two clutch activation apparatuses with one clutch activation pressure, so that the two pilot pressures are conducted to a switchover valve, by way of which the end face, which is remote from the reset spring of the slide valve of the activation unit, can be alternately subjected to the pressure of the greater of the two pilot pressures.

Additionally, this control valve arrangement provides that a speed of rotation related, control pressure can be sent to the slide valve of the self-operating pressure, retention valve that following the failure of the two pilot pressures, as well as in the presence of a predetermined speed of rotation related control pressure at the self-operating pressure, retention valve, the activation pressure from the self-operating pressure, retention valve by way of the activation valve can be forwarded to a selection valve (which lacks a reset spring) by way of the activation pressure, which latter is, in accordance with its setting, applied to that end face, which is remote from the reset spring, of the shorter slide valve of the first clutch control valve or to the end face, which is remote from the reset spring, of the shorter slide valve of the second clutch control valve.

Further, care has been taken that an end face of the slide valve in the selection valve is subjected to the controlled clutch activation pressure of the first clutch control valve while, at the same time, the other end face is subjected to the controlled clutch, activation pressure of the second clutch, control valve so that, in case of an emergency, failure of the two pilot pressures which were held at the closure pressure of the clutch activation apparatus until the speed of rotation related control pressure at the self-operating, valve understeps the predetermined pressure threshold value.

As already mentioned, the technological result attributed to the invention is not due to the construction mode of one or more control valves of the control valve arrangement. In this matter, additional embodiments of the invention provide control valve arrangements, which can be equipped with at least one solenoid, proportionally controllable clutch control valve.

In one embodiment with a solenoid, effective clutch control valve, provision has been made to the effect that the end face, which is remote from the reset spring of the slide valve of the activation valve, as well as the self-operating pressure, retention valve are pressure loaded with that pressure which characterizes a normal operating control pressure, so that clutch activation pressure emanating from the clutch control valve is conducted, without interference, by way of the activation valve to the clutch activation apparatus. Further, the self-operating pressure, retention valve becomes loaded with the speed of rotation related control pressure, whereby, upon the failure of the solenoid clutch valve, as well as upon the failure of the control pressure, which characterizes normal operation for the realization of an emergency operation, an activation pressure from the self-operating pressure, retention valve, by way of the activation valve, can be transferred to the clutch activation apparatus. Thereby the clutch activation apparatus will be held in its engaged position until the speed of rotation, control pressure at the self-operating pressure, retention valve understeps the predetermined pressure threshold.

A constructive diversion from the embodiment now offers the provision, that the clutch control valve is indeed designed as an solenoid, proportionally controllable valve, however, the control regulates the activation valve for the realization of an emergency operation of the clutch activation apparatus by way of a control pressure, which can be directed upon the spring-loaded side of the slide valve of the activation piston of this activation valve.

Thus care has been exercised to the effect that the end face, which is remote from the reset spring of the slide valve of the activation valve as well as the self-operating pressure, retention valve, when in normal operation, can be subjected to the controlled clutch, activation pressure from the solenoid clutch, control valve and that the clutch activation pressure, again, in normal operation, which emanates from the clutch control valve, can be directed by way of the activation valve without interference to the clutch activation apparatus, and that for the activation of an emergency operation of the transmission, an emergency control pressure can be applied to the reset spring-loaded, end face of the slide valve of the activation valve.

This design allows that, after the failure of the solenoid clutch, control valve, the activation pressure from the self-operating pressure, retention valve can be applied, by way of the activation valve, onto the clutch activation apparatus, where the clutch activation apparatus is then held it its engaged position until the speed of rotation, control pressure at the self-operating pressure, retention valve understeps a predetermined pressure threshold.

Another control valve arrangement for the activation of two start clutches, which also function as emergency activation clutches, provides that in an emergency operation of the transmission, the start clutch is held in its engaged position, which clutch was last activated into that engaged position. This control valve arrangement encompasses two clutch activation valves, which can be solenoidally activated for the purpose of activation-control of two clutch activation apparatuses, one self-operating pressure, retention valve, an activation valve, a selection valve, a switchover valve as well as a pressure conversion control valve.

In the normal operation of the transmission, provision is made to the effect that a higher controlled, clutch activation pressure present, respectively in one of the two clutch control valves, by way of a switchover valve, acts alternately against that end face of the slide valve which is remote from the reset spring and/or against the activation valve.

In addition, the controlled clutch, activation pressure of the one clutch control valve can be conducted, by way of a first reversal control valve to a first clutch activation apparatus, as well as to an end face of a slide valve of the selection valve, while the controlled clutch, activation pressure of the second clutch, control valve, by way of a second reversal valve, can be conducted to the second clutch, activation apparatus and, further the second end face of the slide valve at the selection valve can be subjected to this clutch activation pressure.

Moreover, provision is made that, in a case of failure of the two solenoid clutch control valves, an emergency operation of the transmission is assured by way of a pressure, which is dependent upon the speed of rotation, which so acts upon the self-operating pressure, retention valve with a rotational velocity which is above the predetermined threshold of speed of rotation value in such a manner, that an activation pressure from the self-operating pressure, retention valve can be applied by way of the activation valve onto the selection valve, where this activation pressure can be relayed from the selection valve to one of the two reversal valves.

Additionally, provision is made that the two reversal valves can be brought into such an operative setting by way of the activation pressure in which setting the activation pressure can be transferred directly to the assigned clutch activation apparatus, whereby the subject clutch activation apparatus is held in its engaged position until the speed of rotation control pressure understeps the predetermined pressure threshold value.

A further embodiment of this named control valve with two solenoid control valves allows that the selection valve has been so designed, that in an emergency operation of the transmission, specifically that one of the two clutch activation apparatuses is held in an engaged position, which activation apparatus was last set into an engaged position.

This situation can be further revised in that alternative to the loading of the self-operating pressure, retention valve and the activation valve with the controlled clutch, activation pressure, a control pressure, equal to that which is characteristic to normal operation of the transmission, can be applied to that end face, which is remote from the reset spring of the slide valve of these two valves.

Considering the design-oriented formulation of the self-operating pressure, retention valve, it could be advantageously assumed that, if this were so constructed that the speed of rotation-related, control pressure could be conveyed to two separate pressure chambers of the self-operating pressure, retention valve, which chambers were separated by way of at least one control piston of the correlated control slide valve.

In accordance with yet other embodiment of the self-operating pressure, retention valve, provision can be made that the mentioned reversal travel, prevention pressure can easily be directed to the spring-loaded end face of the slide valve of the self-operating pressure, retention valve and that the speed of rotation-related, control pressure can be directed to that pressure chamber of the self-operating pressure, retention valve by way of a one-way valve, which is placed axially, directly beside the pressure space for the acceptance of the reset spring and is located for application with the reversal travel, prevention pressure.

BRIEF DESCRIPTION OF THE DRAWINGS

The invention will now be described, by way of example, with reference to the accompanying drawings in which:

FIG. 9 is a constructive assembly of a self-operating pressure, retention valve as in an aforementioned control valve arrangement, and FIG. 10 is a variation to the self-operating pressure, retention valve in accord with FIG. 9.

DETAILED DESCRIPTION OF THE INVENTION

Figure 1:
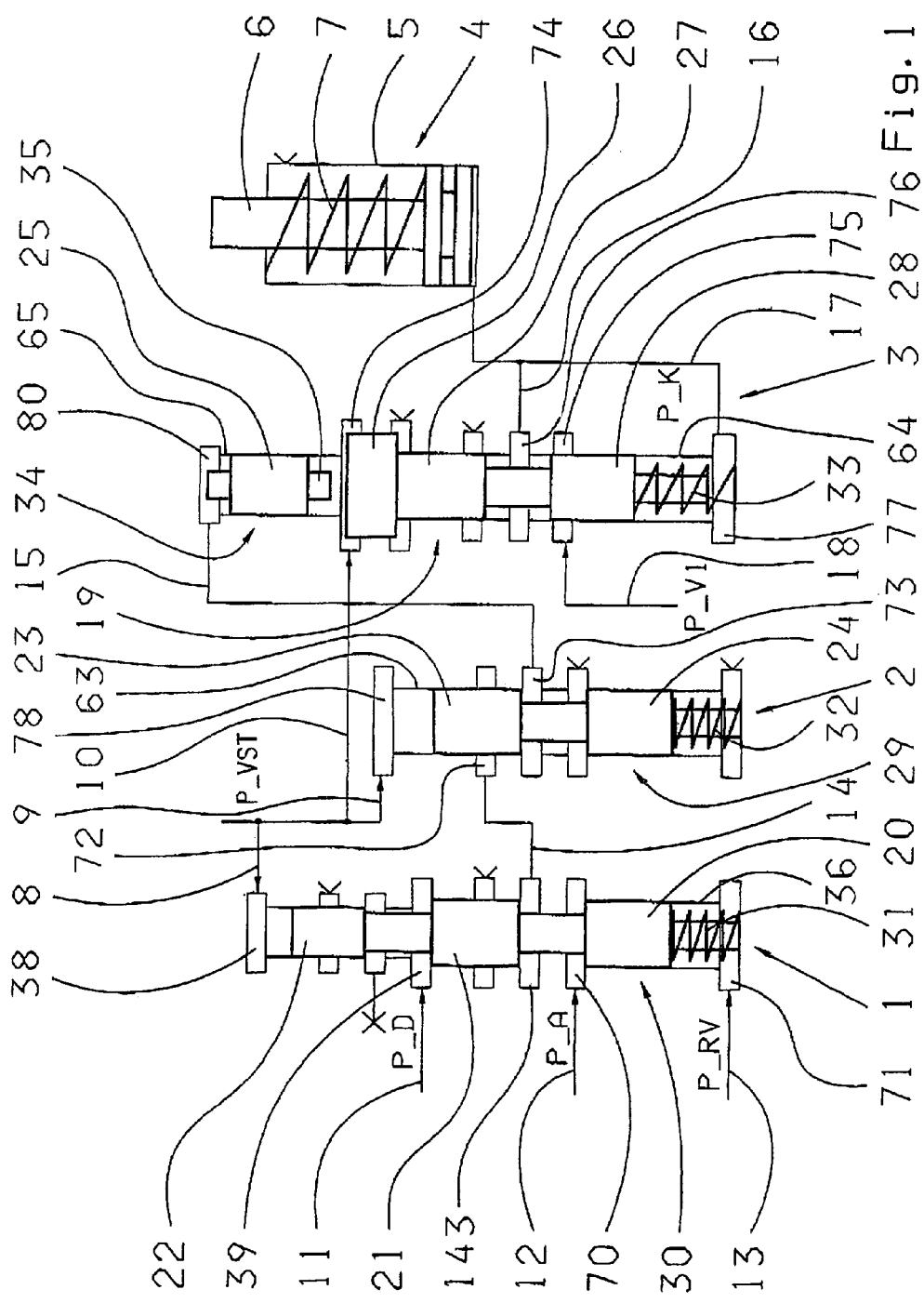
FIG. 1 is a control valve arrangement with a clutch control valve, wherein a pilot pressure for the control valve is employed as a control pressure for an activation valve as well as for a self-operating, check valve.

FIG. 1 displays an assembled and comparatively simple embodiment of a control valve arrangement, according to the invention, and which is of a low manufacturing cost. This control valve arrangement encompasses one self-operating pressure, retention valve 1, an activation valve 2 for emergency operation, (in the following, designated as "activation valve 2"), a clutch control valve 3 as well as a clutch activation apparatus 4. The clutch activation apparatus 4 consists of a cylinder 5 in which is to be found a piston 6. The piston 6 stands within a co-axial helical, reset spring 7 which acts counter to the activation pressure. A pressure application against an end face of the piston 6, which face is remote from the reset spring 7, causes the piston 6 to slide in a closing direction so that a clutch of the transmission for torque transfer is likewise engaged.

The subject clutch (not shown here), but would be known as present to the expert, belongs to an automatic transmission, which can be designed to operate on the basis of a planetary transmission to function as a ratio changing transmission operating in a stepless manner or as a load-shifting, automated simple transmission. In such a case, wherein a control valve arrangement for a double clutch transmission is to be designed then, preferably, two control valves as well as two clutch activation apparatuses should be used, which will be discussed below.

The named valves, i.e., 1, 2 and 3 are disposed in a smooth cylindrical enclosure (not shown) of a hydraulic control apparatus for the transmission, whereby each valve possesses at least one slide valve, which can be axial movable for opening pressure chambers; for disengaging and/or engaging by hydraulic pressure, and also a helical piston, encompassing reset, spring force.

In the case of all following presented embodiments, the self-operating pressure, retention valve 1 and the activating valve 2 are generally identically designed. Thus the self-operating pressure, retention valve 1 comprises one slide valve 30, which is located in a valve boring 36 and is axially movable. The slide valve 30 includes, as part of itself, spaced control pistons namely 20, 21 and 22, whereby the free end face of the control piston 20 is loaded by force from a reset spring 31. Against the axially opposite, located end face of the slide valve 30, a pilot pressure P_VST acts, which is introduced into a pressure chamber 38 by way of a feed-in, pressure line 8.

Additionally to a pressure chamber 39 on the self-operating pressure, retention valve 1, located between the control piston 21 and the control piston 22, a control pressure P_D can be delivered by way of a line 11, the intensity of the pressure thereof being dependent upon the speed of rotation of the drive motor of the vehicle and/or being dependent upon the speed of rotation of the output shaft of the transmission.

Further, an activation pressure P_A is delivered to the self-operating pressure, retention valve 1 to a pressure chamber 70 between the control pistons 20 and 21. The delivery is effected through a line 12 which, when in an emergency operation, takes care that a torque transferring clutch of the transmission remains engaged in accordance with a speed of rotation.

Finally, there is also placed in the self-operating pressure, retention valve 1, a pressure chamber 71 which holds within the reset spring 31 which, by way of a line 13, can be loaded with a reverse travel, prevention pressure P_RV. This arrangement will be further discussed below.

In regard to the assembly of the activation valve 2, it must be mentioned that this valve possesses a slide valve 29 with two control pistons 23, 24, which are mutually spaced away from one another and the piston 23 is axially and slidingly inserted into a boring 63 of the slide valve enclosure. In this specific case, the free end face of the control piston 24 can be loaded by the force of a reset spring 32.

The pilot pressure P_VST in a pressure chamber 78 is delivered to the axial, oppositely situated end face of the slide valve 29 by way of a line 9. A line 14 additionally connects the pressure chamber 70 (or 143) of the self-operating pressure, retention valve 1 with a pressure chamber 72 of the activation valve 2, whereby this pressure chamber 72, by way of the control piston 23, which is remote from the reset spring 7, can be engage or made to communicate with a pressure chamber 73 on the activation valve 2.

The clutch valve 3 encompasses an axial longer, control slide valve 19 with three control pistons 26, 27 and 28, as well as with an axially shorter, control slide valve 34, which is axially and slidingly located in borings 64, 65 of the slide valve enclosure. Further, in this matter, the axially longer, control slide valve 19 can be loaded on the free end of the control piston 28 by the restoration force of a reset spring 33.

The axially shorter, control slide valve 34 includes a slide valve 25, the end face of which is proximal to the other slide valve 19, which can be loaded by the pilot pressure P_VST. Correspondingly, this pilot pressure P_VST is available from a pressure chamber 74 on the clutch control valve 3 by way of a line 10. On the oppositely situated end face of the piston 25, the activation pressure P_A can be delivered through a line 15, which is connected with the pressure chamber 73 on the activation valve 2.

The axially longer, control slide valve 19 of the clutch control valve 3 possesses, as part of its construction, three control pistons 26, 27, 28, where two pistons 26, 27 are placed immediately next to one another. The free end face and the oppositely situated end of the axially shorter, control slide valve 34 of the slide valve 26 are likewise subject to the pilot pressure P_VST emanating from the pressure chamber 74 while that end face, which is remote from the reset spring of the control piston 28 communicates with a pressure chamber 75, which itself is subjected to the pressure from a system source or a supply pressure P_V1.

By way of an appropriate control of the clutch control valve 3, this pressure chamber 75 can be connected with a neighboring pressure chamber 76 through the pilot pressure P_VST, so that a controlled clutch pressure P_K can function in the pressure chamber 76 through the control piston 28. By way of a line 16, the pressure chamber 76 is additionally connected with the cylinder 5 of the clutch activation apparatus 4 as well as with a pressure chamber 77 on the clutch control valve 3, which also houses the reset spring 33.

The method of operation, i.e., the functionality, of the control valve arrangement, according to FIG. 1, is outlined below.

In normal operation, the pilot pressure P_VST is so adjusted in that the slide valve 30 on the self-operating pressure, retention valve 1 is axially pushed against the force of the spring 31 to the extent that the control piston 20 opens a path for the activation pressure P_A from the pressure chamber 70, through the pressure chamber 143 and the line 12, to gain access to the pressure chamber 72 of the activation valve 2.

Additionally, the pilot pressure P_VST acts in the pressure chamber 78 of the activation valve 2 in such a manner that the slide valve 29 is pushed against the force of the reset spring 32 to take its place so far into the boring 63 that the pressure chamber 73 is separated from the pressure chamber 72.

Beyond this, the axially longer, control slide valve 19 of the clutch control valve 3 is loaded with the pilot pressure P_VST through the line 10; that a rim of the control piston 28 more or less frees up the pressure chamber 75 on the clutch control valve 3. In this way, with a dependency on the intensity of the pilot pressure P_VST, a supply pressure P_V1 is regulated to serve as a clutch activation pressure P_K, with which the clutch activation apparatus 4 can finally be brought into a position for opening or closing the attached clutch. Obviously, it is possible that interposed positions can be adjusted to in which the clutch would be slipwise operated.

Should it occur, for example, that by a disturbance in the transmission control equipment, the pilot pressure P_VST drops out, or at least reduces itself drastically, then the speed of rotation dependent control pressure P_D at the self-operating pressure, retention valve 1 becomes activated. Insofar as the motor speed of rotation or, alternately, the speed of rotation of the output shaft of the transmission is so high that a stalling of the motor need not be expected, then even this controlling pressure P_D will be so high that this is in a situation where it can hold the slide valve 30 of the self-operating pressure, retention valve 1 in a position in which the activation pressure P_A can be conducted through pressure chambers 70 and 143, as well as through the line 14 to the pressure chamber 72 of the activation valve 72.

The function of the self-operating pressure, retentive valve 1 is extinguished if the speed of rotation related control pressure P_D drops below a predetermined value. This pressure threshold characterizes the stalling speed of rotation of the motor. In this case, the slide valve 30, by the force of the reset spring 31, is axially moved in the direction of the pressure chamber 38, so that the activation pressure supply to the activation valve 2 is interrupted.

In an emergency operation, the pilot pressure P_VST drops to zero in the pressure chamber 78 of the activation valve 2 or is at least significantly reduced, so that the slide valve 29, by way of the force of the reset spring 32, is so displaced in the direction of the pressure chamber 78, that the pressure chamber 72 and the pressure chamber 73 become bound together. Thereby, the activation pressure P_A is conducted through the line 15 to a pressure chamber 80 on the clutch control valve 3, at which point this pressure then acts upon the axially shorter, control slide valve 34. As a result of this, an axial section 35 of the slide valve 34 exerts pressure upon the free end face of the piston 26 of the axially longer, control slide valve 19, whereby this is axially pushed against the force of the reset spring 33. For this reason, in spite of the failing pilot pressure P_VST, the connection between the pressure chamber 75 and the pressure chamber 76 is held in the open state.

By way of this method of operation, it is possible that, even in a case of the failure of the pilot pressure P_VST by way of a line 18, the pressure chamber 75, 76, as well as the line 16, a clutch activation pressure P_K, which holds the clutch activation apparatus 4 in its engaged position, can be conducted to the same.

Should the motor speed of rotation or the transmission speed of rotation drop to such an extent that stalling of the motor must be reckoned with, then too, the related speed of rotation related pressure P_D is correspondingly also lowered. This leads, finally, to a break in the emergency operation of the transmission, since under these circumstances, the force of the reset spring 31 on the self-operating pressure, retention valve 1, without pressure obstruction, becomes sufficient to push its slide valve 30 so far in an axial direction, that the activation pressure connection between the pressure chamber 70 on the self-operating pressure, retention valve 1 and the pressure line 14 can no longer sustain itself.

As a result of this, even the shorter, control slide valve 34 becomes, of the clutch control valve 3 is no longer pressurized with the activator pressure P_A, while the longer, control slide 19, driven by the force of the reset spring 33, is pushed into such a position, where the connection between the pressure chambers 75, 76 are interrupted. Thereby, also the clutch activation pressure in cylinder 5 of the clutch activation apparatus 4 declines to the extent that its piston 6, driven by the force of the reset spring 7, is pushed into its open state.

As is made clear in FIG. 1, it is possible that the clutch activation apparatus 4, upon a resurgence of the speed of rotation related pressure P_D, in accordance with an emergency operation, cannot be immediately brought into its engaged position so that an advantageous safety precaution is made to exist, so that, for example in a repair-shop, the motor speed of rotation may be driven so high for test purposes, without causing an increase of the speed of rotation dependent pressure P_D and, automatically, an adjustment to closure in the automatic transmission might be made.

Additionally it is obvious that the end face, which is proximal to the reset spring 33 of the control piston 28 of the control slide valve 19, by way of the pressure chamber 76 and lines 16 and 17 may, likewise, be loaded with the controlled clutch activation pressure P_K, i.e., with the activation pressure P_A.

Finally, FIG. 1 shows that, in a case of a selected reverse travel direction, the pressure chamber 71, which contains the reset spring 31 of the self-operating pressure, retention valve 1 may be subjected to the pressure of a reverse travel protection pressure P_RV where, in a case of a deficiency of the pilot pressure P_VST, the slide valve 30, by the force of the spring 31 combined with the pressure P_RV will be axially transported so far that the pressure chamber 39 becomes engaged, as well as that the pressure loading of the control piston 21 is provided with the speed of rotation related control pressure P_D. The reverse travel prevention pressure P_RV, when the control pistons 20, 21 have equal diameters, can be selected to be greater than the speed of rotation related control pressure P_D.

Figure 2:
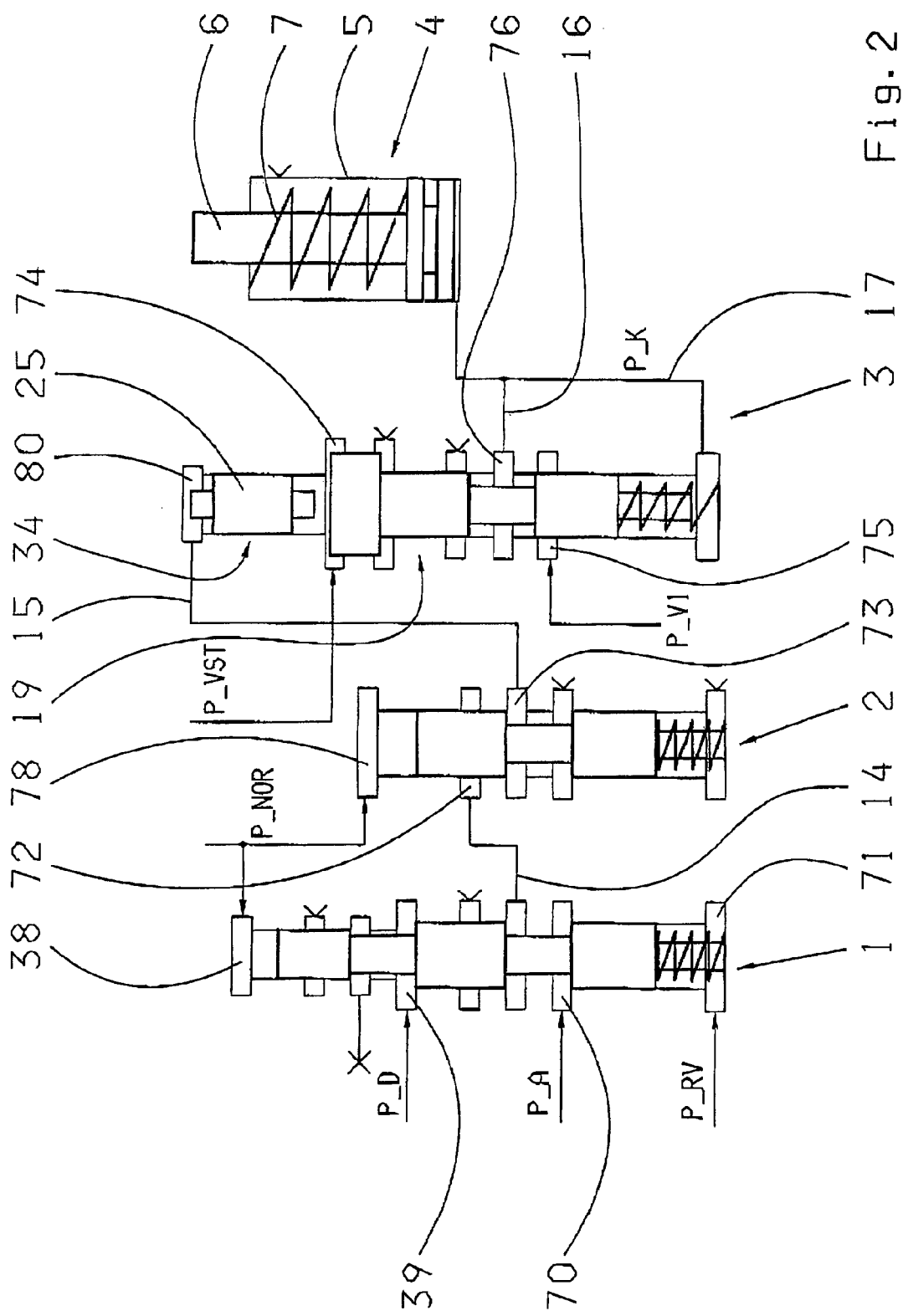
FIG. 2 is a control valve arrangement with clutch control valve with which a separate control pressure for the control of the activation valve is used.

The illustrated control valve arrangement in FIG. 2 differentiates itself from the above explained embodiment, essentially in that in normal operation, the pilot pressure P_VST is exclusively directed to act upon the clutch control valve 3, while the pressure chamber 38 of the self-operating pressure, retention valve 1 and the pressure chamber 78 of the activation valve 2 are loaded by a control pressure P_NOR, which characterizes normal operation.

The pressure P_NOR, upon the failure of drastic reduction of the pilot valve P_VST for the realization of the described emergency operation, can be likewise diverted so that when the speed of rotation related control pressure P_D lies above the pressure threshold, the activation pressure P_A, can be forwarded by way of the self-operating pressure, retention valve 1, the line 14, the pressure chambers 72, 73 of the activation valve 2 and the line 15 at the end face, which is remote from the reset spring 31, of the control piston 25 of the shorter, control slide valve 34 of the clutch control valve 3.

Thereby the possibility exists, as has already been described in connection with FIG. 1, the slide valve 34 acts axially on the control slide valve 19, in the result of which action, the supply pressure P_V1 can be forwarded by way of the pressure chambers 75, 76 as well as by the line 16 to the cylinder 5 of the clutch activation apparatus 4. In this way, the clutch, which is activated by the clutch activation apparatus 4, even during a failure or drastic diminution of the pilot pressure P_VST is held engaged so that, in the emergency operation of the transmission, a forward motion of the vehicle can be managed.

Figure 3:
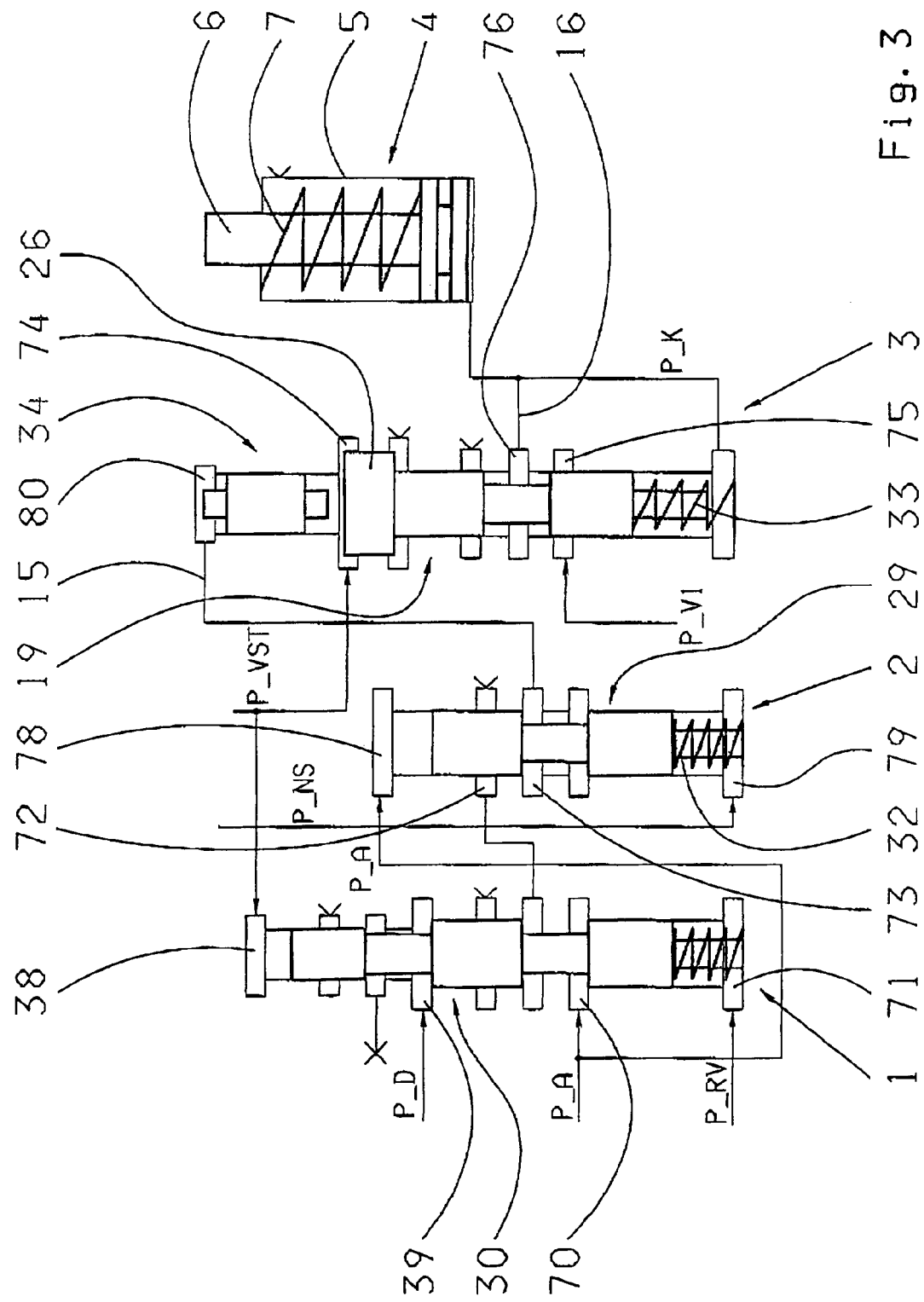
FIG. 3 is a control valve arrangement with clutch control valve with which a separate control pressure is used for a converted control of the activation valve.

The control valve arrangement, presented in FIG. 3 as an embodiment example, differentiates itself only comparatively and slightly from the embodiments shown in FIG. 1 and FIG. 2. Thus, in this case, the pilot pressure P_VST can be conducted into the pressure chamber 38 of the self-operating pressure, retention valve 1 as well as into the pressure chamber 74 of the control valve 3. Additionally, the activation pressure P_A is directed, not only to the pressure chamber 70 at the self-operating pressure, retention valve 1, but also to the pressure chamber 78, which is remote from the reset valve at the activation valve 2. Finally, in order to realize an emergency operation, a control pressure P_NS, which characterizes this particular emergency, can be directed to a pressure chamber 79, which contains the reset spring 32 of the activation valve 2.

Insofar that, because of an operational disturbance, the pilot pressure P_VST drops out or is severely reduced, it is true that by way of a sufficiently higher speed of rotation of the motor or, correspondingly, a higher speed of rotation of the output of the transmission by way of the speed of rotation related control pressure P_D of the control slide valve 30, then the self-operating pressure, retention valve 1 will be retained specifically in that position, shown in FIG. 3. However, the activation pressure P_A, which is also present in the pressure chamber 78 of the activation valve 2, so acts that its slide valve 29 also remains in the depicted position. Only under such a circumstance which characterizes the emergency operation, a control pressure P_NS becomes active in the pressure chamber 79 of the activation valve 2, can the slide valve 29 be pushed in the direction of the pressure chamber 78, so that the pressure chamber 72 is brought into communication with the pressure chamber 73.

When this occurs, then the activation pressure P_A of the pressure chamber 73, by way of the line 15 becomes open to the pressure chamber 80 of the clutch control valve 3, so that the axially shorter, control slide valve 34 acts in such a manner upon the control piston 26 of the longer, control slide valve 19, allowing the latter to be axially moved, against the force of the reset spring 33 and the pressure chamber 75 to be bound to the pressure chamber 76. Now, in an already described manner, the clutch activation pressure P_K communicates over the line 16 to the cylinder 5 of the clutch activation apparatus 4 and, as an ensuing result, this remains in its engaged position until the speed of rotation control pressure P_D understeps the predetermined pressure threshold.

Figure 4:
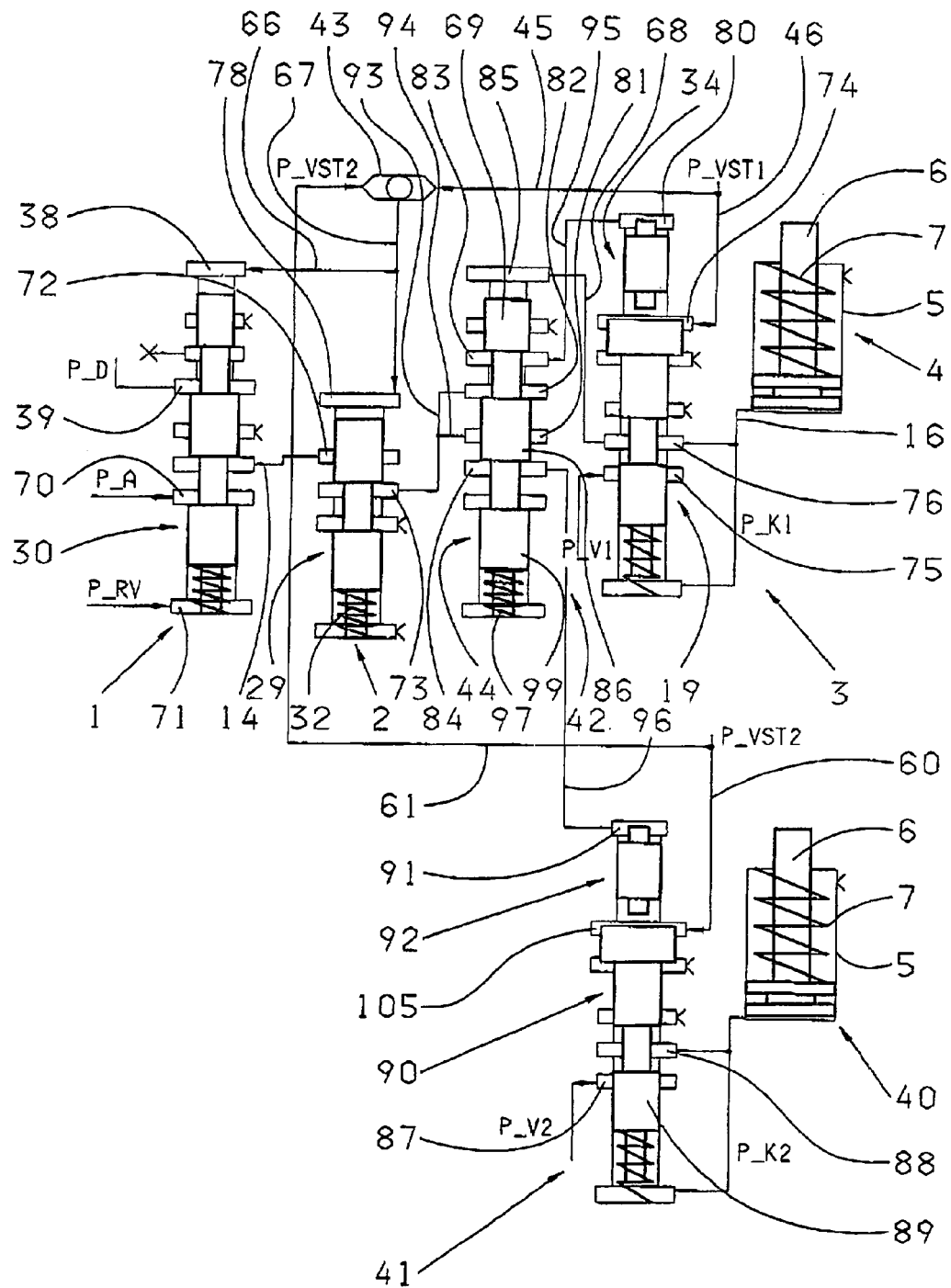
FIG. 4 is a control valve arrangement with two clutch control valves with which alternate to one another, the pilot pressure for the two control valves are used both as a control pressure for an activation valve and for a self-operating pressure, retention valve, as well as one of two clutch, activation apparatuses, which are held in their engaged position while in an emergency operation of the transmission.

In the case of the embodiment, illustrated in FIG. 4, this is an embodiment of a control valve arrangement designed within the framework of the invention. In total, there are two clutch activation apparatuses 4 and 40, which are of use for an emergency operation of the transmission. These two apparatuses 4, 40 are for two start clutches, for example, provision for a double clutch gear train, wherein the first clutch activation apparatus 4, oppositely situated the second clutch activation apparatus 40, is advantageously retained in its engaged state.

Also, this control valve arrangement includes the self-operating pressure, retention valve 1 and the activation valve 2, which two valves, by way of a selection valve 42, for the purpose of relaying the already multiply mentioned activation pressure P_A, bind themselves together in a pressure-technological manner with a first clutch, control valve 3 or a second clutch, control valve 41.

Especially noted is the fact that in the functionality of this control valve arrangement, a switch-over valve 43 can be subjected to pressure, by way of a line 45 or as well by a line 61 with two pilot pressures P_VST1, P_VST2. These two pressures can be delivered over lines 46 or 60 to the pressure chamber 74 or 105 of the longer, control slide valve 19 or 90 of the two clutch, control valves 3 and 41. The respective immediately larger pilot pressure P_VST1 or P_VST2 acts in normal operation of the transmission by way of lines 66 and 67 to act upon the pressure chamber 38 of the self-operating pressure, retention valve 1 and upon the pressure chamber 78 of the activation valve 2.

Further, FIG. 4 clarifies that the activation pressure P_A of the self-operating pressure, retention valve 1 can be continually transferred over the activation valve 2 as well by way of two lines 93, 94 to pressure chambers 81, 82 of the selection valve 42. In relation to the selection positioning of a control slide valve 44 of the selection valve 42 in a first operational position, this activation pressure P_A of the pressure chamber 82 and a pressure chamber 83 is directed by selection valve 42 by way of a line 95 to that pressure chamber 80 on the end face, which is remote from the reset spring of the shorter, control slide valve 34 of the first clutch, activation valve 3. In a second operational positioning of the selection valve 42, the activation pressure P_A is forwarded through the pressure chamber 81 and a pressure chamber 84 as well as by way of a line 96 to a pressure chamber 91, which is located in the area of that end face and which is remote from the reset spring of a shorter, control slide valve 92 on the second clutch, control valve 41.

Finally, it is a specific design feature of the control valve arrangement, according to FIG. 4, that the control slide valve 44 of the selection valve 42 is subjected to the application of a restoration force on one of its end faces, by way of a reset spring 97 and further that the oppositely controlled clutch activation pressure P_K1 of the first clutch, control valve 3 over a line 68. The latter pressure emanates from a pressure chamber 85 on the selection valve 42.

Giving consideration to the above operational possibilities of the control valve arrangement, according to FIG. 4, the following method of functioning is possible.

In the normal operation of the transmission, at least one of the two pilot pressures P_VST1 or P_VST2 acts through the switch-over valve 43 to load the pressure chambers 38 and 78, respective of the self-operating pressure, retention valve 1 and of the activation valve 2. In this way, the control slide valve 29 of the activation valve 2 is so positioned that an activation pressure P_A from the self-operating pressure, retention valve 1 cannot be delivered over the line 14 to the selection valve 42. Additionally, at least one of the two clutch activation apparatuses 4 or 40 are activated by way of the pilot pressure P_VST1 or P_VST2 to reach an engaged position.

To the extent that the two pilot pressures P_VST1, P_VSR2 fail or are drastically reduced, then the control slide valve 29 on the activation valve 2 is pushed so far from the assigned reset spring 32 in the direction of the pressure chamber 78, that the two pressure chambers 72, 73 on the activation valve 2 are bound together in a pressure-technological manner.

Insofar as the speed of rotation related control pressure P_D, which acts upon the pressure chamber 39 on the self-operating pressure, retention valve 1 is intense enough, then the control slide valve 30 is retained in a position shown in FIG. 4, so that the activation pressure P_A of the self-operating pressure, retention valve 1 can be conducted through the line 14 and through the pressure chamber 72 or 73 on the activation valve 2 to the selection valve 42. The activation pressure P_A thus appears in this way in the pressure chamber 81 of the selection valve 42.

In a case of failure of the pilot pressure P_VST1 to act upon the first clutch control valve 3, since the control slide valve 44 of the selection valve 42 remains in its depicted position, due to the presence of the still existing clutch activation pressure P_K1 from the pressure chamber 76 of the first clutch, control valve 3 by way of the line 68 to the pressure chamber 85 on the selection valve 42 in FIG. 4. Thus, in this emergency operation, a path is made free for the activation pressure P_A from the pressure chamber 73 of the activation valve 2 though the line 93, the pressure chamber 82 and through the pressure chamber 83 as well as by way of the line 95 to the pressure chamber 80 on the shorter, control slide valve 34 of the first clutch, control valve 3.

In this way, it is possible that the shorter, control slide valve 34 can establish an axial force upon the longer, control slide valve 19 of the first clutch, control valve 3 which force, in spite of failure of the pilot pressure P_VST1, will hold this longer, control slide valve 19 in a position open to the pressure chamber 75. Thus, the supply pressure P_V1, by way of the pressure chambers 75, 76, as well as through the line 16 gains access to the cylinder 5 of the first clutch, activation apparatus 4 for the purpose of holding this apparatus in the engaged position.

By way of an exact fitting design of the diameter of a control piston 69, which is remote from the reset spring of the control selection valve 42 as well as the restoration force of its reset spring 97, it is possible that this control valve arrangement, according to FIG. 4, can also be constructed to function effectively, so that upon the failure of the two pilot pressures P_VST1, P_VST2, a control piston 86 of the control slide valve 44 of the selection valve 42 remains in its second shifted position.

In this second shifted position, the activation pressure P_A of the pressure chamber 73 of the activation valve 2 is conducted through the line 94 to the pressure chamber 81 of the selection valve 42 and from there, by way of the pressure chamber 84 and the line 96 to the pressure chamber 91 of the second clutch control valve 41. At that location, the shorter, control slide valve 92 acts in the already mentioned manner on the longer, control slide valve 90, in such a manner that the control piston, which is loaded with a reset valve releases the connection between two pressure chambers 87, 88. There the supply pressure P_V2 is directed to the cylinder 5 of the second clutch, activation apparatus 40 where, in spite of the failure of the pilot pressure P_VST2, this is held just so long in its engaged position until the speed of rotation related control pressure P_D at the pressure chamber 39 of the self-operating pressure, retention valve 1 has fallen below the predetermined threshold pressure.

Figure 5:
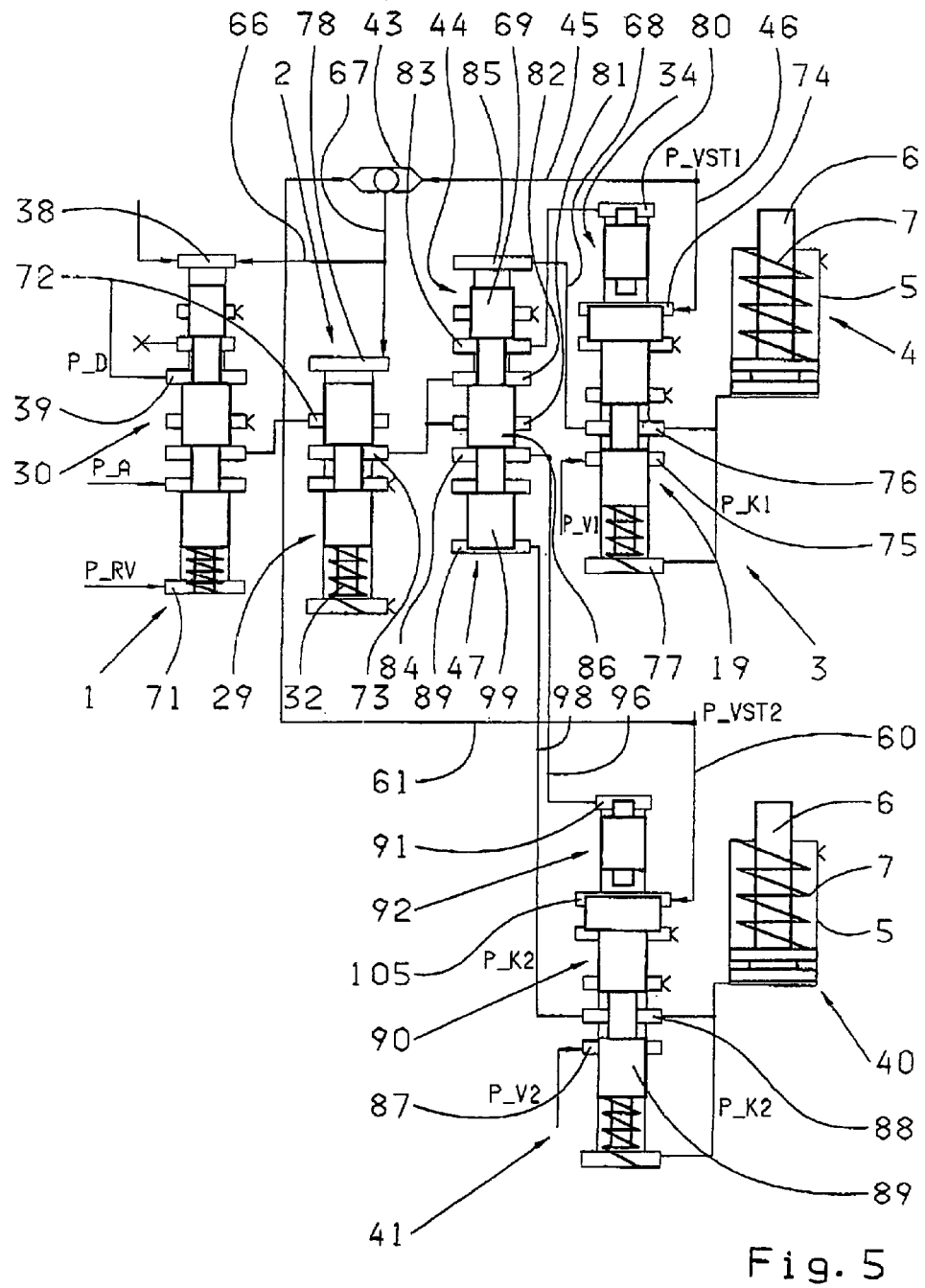
FIG. 5 is a control valve arrangement, as in FIG. 4, in the case of which however, one of two clutch activation apparatuses, in the emergency operation of the transmission, is held in the engaged position, which one clutch activation apparatus had already been placed in its engaged position.

FIG. 5 shows a further embodiment of the inventive control valve arrangement, by way of which one of two clutch activation apparatuses 4 and 40, are held in their engaged position during an emergency operational phase, which was the last position in which they were formerly placed.

Exhibiting a difference to the control valve arrangement according to FIG. 4, in this case it is first provided that a selection valve 47 possesses no reset spring. Additionally, in the case of this selection valve 47, the two control pistons 69 and 99 at the axial ends of the control slide valve 44 are subjected to the control pressure P_K1 and P_K2. Deviating from the control valve arrangement, according to FIG. 4, in this case, the controlled clutch, activation pressure P_K2 of the second clutch, control valve 41 is directed from its pressure chamber 88, over a line 98 to the pressure chamber 89 on the end face side of the control piston 99 of the selection valve 47.

For the activation of the emergency operation of the transmission, the pilot pressures P_VST1 and P_VST2 become inoperable or very much diminished. Additionally, the speed of rotation related control pressure P_D acts upon the pressure chamber 39 on the self-operating pressure, retention valve 1, with a level of pressure which is high enough to keep the control slide valve 30 of the self-operating pressure, retention valve 1 in the activation mode, as is shown in FIG. 5.

Since both pilot pressure P_VST1 and P_VST2 are not enabled to maintain sufficient pressure in the pressure chamber 78 of the activation valve 2, then its slide valve 29 is displaced in the direction of the pressure chamber 78 by way of the force of the reset spring 32, so that the pressure chambers 72 and 73 of the activation valve 2 are bound together within the technology of pressure. Thereby, the activation pressure P_A is conducted by way of the self-operating pressure, retention valve 1 and the activation valve 2 to the pressure chamber 81 and 82 of the selection valve 47. Insofar as the clutch activation valve which, in an immediately prior time, was in its engaged position, was actually the second clutch, activation apparatus 40, then this acts for the direction of the clutch activation pressure P_K2 from the pressure chamber 88 of the second clutch, control valve 41 by way of the line 98 to the pressure chamber 89 on the selection valve 47, so that the control slide valve 44 becomes pushed so far in the direction of the pressure chamber 85; that the activation pressure P_A from the pressure chamber 81, by way of the pressure chamber 84 of the selection valve 47, is conducted through line 96 to that end face, which is remote from the reset spring of the shorter, control slide valve 92 of the second clutch, control valve 41.

As a result of the above, this shorter, control slide valve 92 acts axially on the longer, control piston 90, whereby this latter is held in an activation position, in which the control piston 89, which is subjected to the face of a reset spring, hold the flow connection open between the pressure chamber 87 and pressure chamber 88. In this manner, it is possible, that from the supply pressure P_V2, the clutch activation pressure P_K2 can be formed which, in this emergency operation, now holds engaged, that clutch activation apparatus 40, which was most recently in the engaged position. This occurs in the same way as in the case of the other control valve arrangements, however, only during that time that the speed of rotation related control pressure P_D lies above the predetermined pressure threshold.

Due to this knowledge of the described assembly, as well as of the explained functionality, an expert would quickly grasp that when, contrary to the last example, the first clutch, activation apparatus 4 was immediately activated in the engaged position, this being held in the engaged position, due to a failure of the pilot pressures P_VST1 and P_VST2, which brought about the governing emergency operation.

Figure 6:
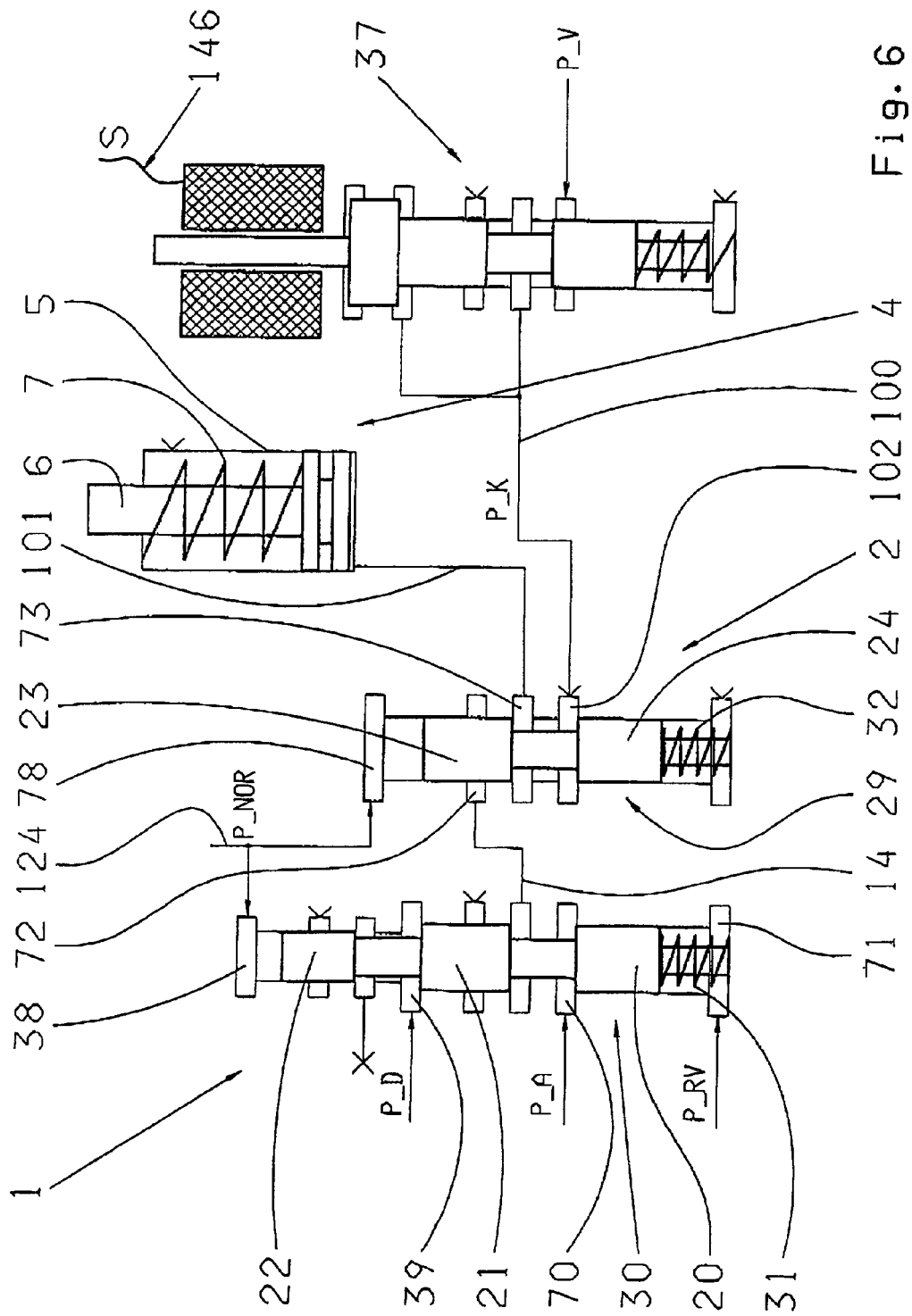
FIG. 6 is a control valve arrangement with an solenoid clutch valve with which a separate control pressure for the control of the activation valve is used.

FIG. 6 clarifies a control valve arrangement, according to the invention, which arrangement is in a comparatively well designed manner and of simple assembly, wherein the advantages which are desired to be attained do not lie in the mode of construction. In the depicted embodiment example, the clutch control valve is not controlled by the influence of a pilot pressure. Rather, the depicted construction includes a solenoid operated clutch control valve 37 which, in response to a warning signal S received through an electrical line 146, so acts as to provide a proportional clutch activation pressure P_K.

For the realization of the desired functionality, this control arrangement includes the self-operating pressure, retention valve 1 and the activation valve 2 with slide valves 29 and 30 which, during normal operation, are loaded at their end faces, which are remote from the reset springs 31, 32, by a control pressure P_NOR, which is characteristic of the normal operation. This control pressure P_NOR is introduced to the two valves 1 and 2 through a control pressure line 124 to the end face pressure chambers 38 and 78.

Moreover, a speed of rotation related control pressure P_D acts, in the already explained manner, on the centrally located control piston 21 of the self-operating pressure, retention valve 1. Likewise, with the existing control pressure P_NOR, the activation pressure P_A is also brought upon a pressure chamber 70 between the two control pistons 20 and 21.

This activation pressure P_A is conducted through the line 14 to the pressure chamber 72 on the activation valve 2, which activation valve 2 is engaged during a normal operational condition by way of the piston 23 of the control slide valve 29 against further extension of the pressure. In this operation, two pressure chambers 73 and 102, which are located between the two control pistons 23 and 24 are bound together in a pressure-technological manner. This action now permits that a clutch activation pressure P_K, which has been generated by the solenoid operating clutch, control valve 37 from a supply pressure P_V, can now be conducted to the cylinder 5 of the clutch activation apparatus 4 through lines 100 and 101.

Should the case be that, due to dome defect, the solenoid control valve 37 becomes inoperable, then that pressure P_NOR, which is characteristic of normal operation, is either diverted or so reduced that the control slide valve 29 of the activation valve 2 by the power of the reset spring 32 becomes axially transported in the direction of the pressure chamber 78. Insofar as the motor or the output speed of the transmission lies above the stalling speed of the motor, then the speed of rotation related control pressure P_D is sufficiently high, so that at the self-operating pressure, retention valve 1 of the control slide valve 30, in spite of the failure of the pressure P_NOR in the pressure chamber 38, is still enabled to maintain the position shown in FIG. 6.

Thereby the activation pressure P_A is conducted from the self-operating pressure, retention valve 1 by way of the line 14, the pressure chambers 72, 73 of the activation valve 2 and the pressure line 101 to the clutch activation apparatus 4. In this way, in spite of the failure of the clutch control valve 37, the clutch activation apparatus 4 is held as long in the engaged position until the speed of rotation related control pressure P_D lies above a predetermined pressure value and simultaneously above that pressure which represents stalling the motor.

Since the control piston 24 of the control slide valve 29 of the activation valve 2 in this emergency operational phase has engaged the pressure chamber 102, it is possible that no hydraulic pressure fluid can escape over the line 100 to the solenoid control valve 37. Note is made, only in the interests of a complete explanation that even in this above described case of the invention, a reverse travel prohibiting pressure P_RV would be conducted to the pressure chamber 71 of the self-operating pressure, retention valve 1 to bring about the desired effect.

Figure 7:
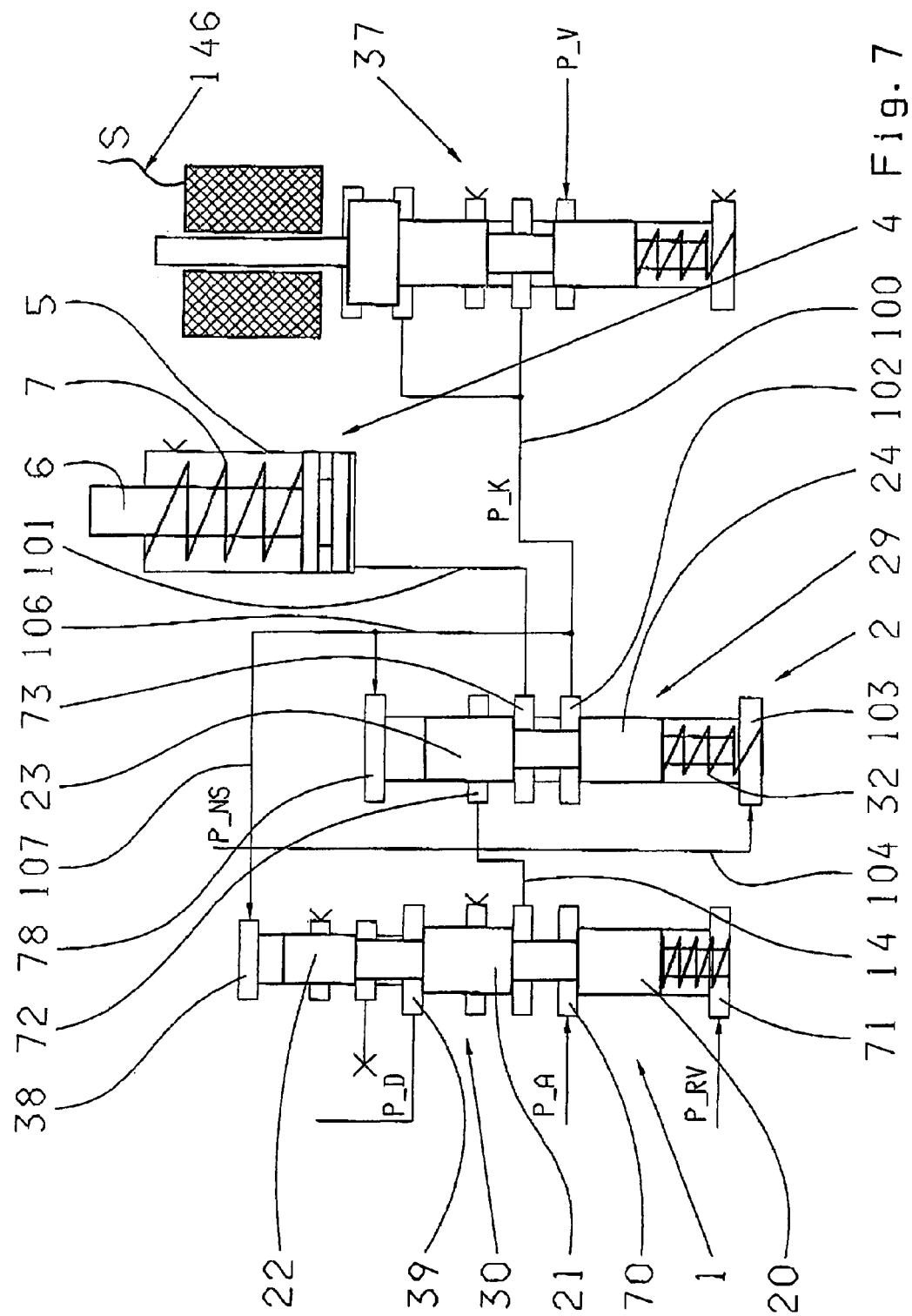
FIG. 7 is a control valve arrangement with an solenoid clutch control valve with which a separate control pressure for inverse control of the activation valve is employed.

FIG. 7 shows an embodiment, according to the invention, which is slightly changed from the foregoing, wherein a differentiation is made to the control valve arrangement of FIG. 6, in that the pressure chambers 38 and 78 on the self-operating pressure, retention valve 1 or on the activation valve 2 can be pressure loaded through lines 100 and 106 or 107 with the clutch activation pressure P_K which is forwarded from the solenoid control valve 37.

Additionally, provision here has been made that even the pressure chamber 103 on the activation valve 2, which can contain the reset spring 32, can be subjected to pressure from through a line 104 with a control pressure P_NS, which is characteristic of the emergency condition. Within the control valve arrangement of FIG. 7, insofar as the solenoid clutch valve 37 drops out, then also the clutch activation pressure P_K reduces itself in the pressure chambers 38 and 78 as well as 102 and 73, which has been acting upon the clutch activation pressure P_K.

At this time, in order to bring the activation valve 2 into its emergency state of operation, the pressure chamber 103, proximal to the reset spring, is loaded with the control pressure P_NS, whereby the control slide valve 29 is axially pushed so far toward the pressure chamber 78, that the pressure chambers 72 and 73 become bound to one another. Thereby the path for the activation pressure P_A is made free, which the pressure can now emanate from the pressure chamber 70 of the self-operating pressure, retention valve 1 up to the clutch activation apparatus 4. The pressure P_A can now hold the clutch activation apparatus in its engaged position until the speed of rotation related control pressure P_D drops below the predetermined pressure threshold value.

Figure 8:
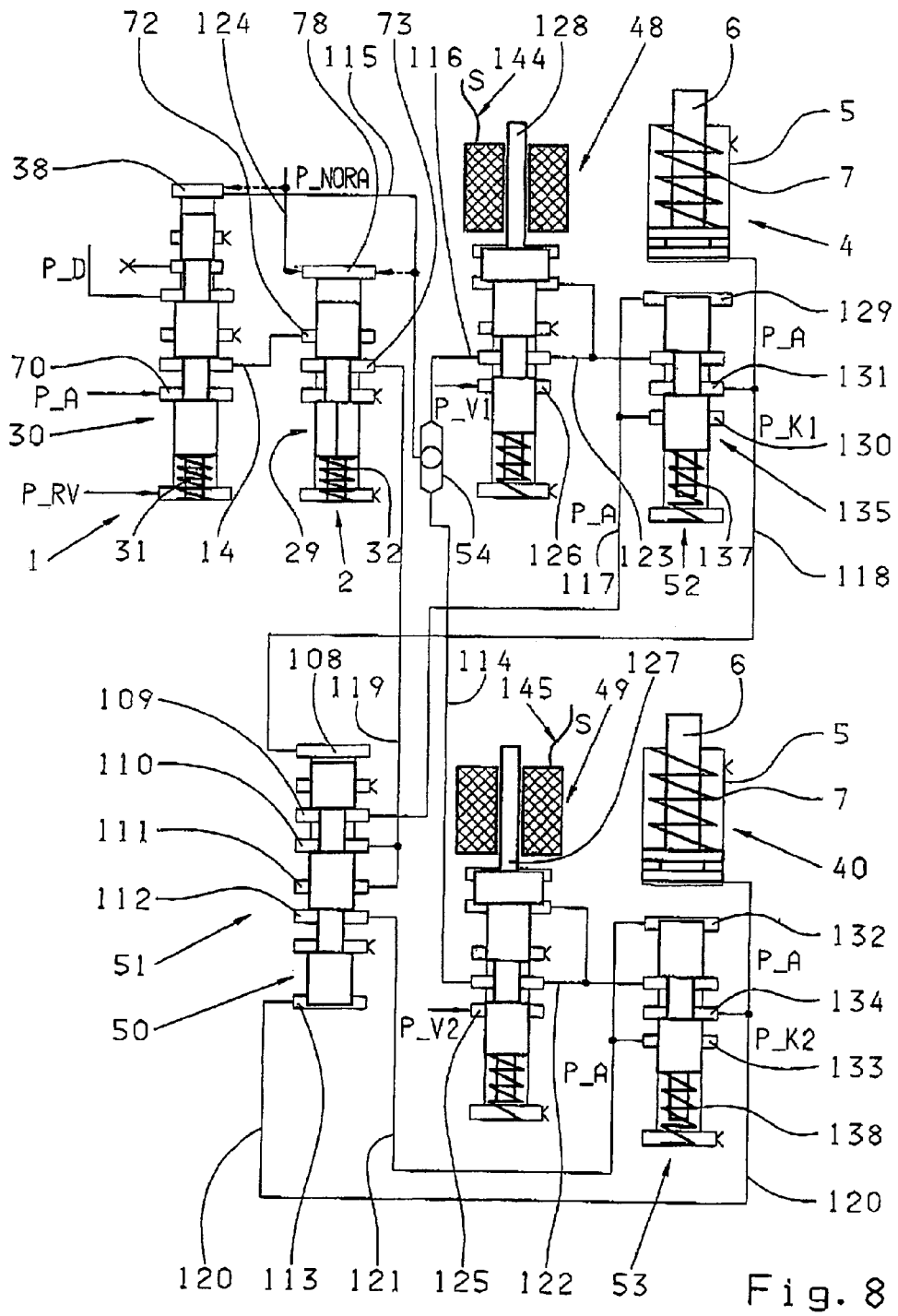
FIG. 8 is a control valve arrangement with two electromagnetic clutch valves with which a separate control pressure for inverse controlling of the activation valve is used, whereby one of two clutch activation apparatuses in an emergency operation of the transmission is held in its engaged position, but wherein the valve was preliminarily placed in its engaged position.

The last embodiment example for a control valve arrangement, designed according to the invention, is shown in FIG. 8. In this control valve arrangement, two solenoidally activated clutch, control valves 48, 49 are present with which two clutch activation apparatuses 4, 40 can activate two clutches (not shown). The belonging control valves are, in this case, so constructed and placed that, in an emergency operation of the transmission, that particular clutch activation apparatus 4 or 40 is continually held in its engaged position until the motor or the transmission out speed of rotation drops under that speed which sustains operation without stalling.

Additionally to the two clutch control valves 48 and 49, this control valve arrangement encompasses a self-operating pressure, retention valve 1 and an activation valve 2, along with a selection valve 51 and two proportional flow solenoid valves 52, 53 (hereinafter designated as "conversion valves 52, 53"). The control-technological action of this control valve arrangement will be described by way of a presentation of its normal running condition.

In the normal operation of the transmission and by way of electrical connections 144 or 145, the control signal S acts upon the solenoid clutch control valves 48 or 49, from a transmission control apparatus (not shown), by way of which each proportional flow, solenoid valve 52, 53 provides a pressure loading for the displacement of an assigned control slide valve 127 or 128. Thereby at the respective pressure chamber 125 and/or 126, existing supply pressure P_V1 or P_V2 is converted to a clutch activation pressure, namely P_K1 and/or P_K2.

In the case of the first solenoid clutch, control valve 48 the immediate clutch activation pressure P_K1 is conducted over a pressure line 123 to the first conversion valve 52, from which the valve, this pressure, in the depicted set position, is forwarded over line 118 to the cylinder 5 of the first clutch, activation apparatus 4 so that the piston 6 thereof is, for example, forced into an engaged position.

Moreover, the clutch activation pressure P_K1, through a line 116 is conducted to a switch-over valve 54 and from this, directed to the pressure chamber 38 and/or 78 of the self-operating pressure, retention valve 1 and/or to the activation valve 2.

In the case of the second proportional solenoid valve 49, the clutch activation pressure thereof, namely P_K2, is conducted over a line 122 to the second conversion valve 53, from which this same pressure, in the illustrated set position of the valve, is conducted through a line 120 to the cylinder 5 of the second clutch, activation valve 40, so that the piston 6 thereof, for example, is placed in an engaged position.

Moreover, the clutch activation pressure P_K2 is conducted by way of a line 114 to the already mentioned switch-over valve 54, from which this pressure is directed to the pressure chamber 38 and/or 78 of the self-operating pressure, retention valve 1 and/or of the activation valve 2. The switch-over valve 54 forwards only the respective higher of the two clutch activation pressures P_K1 or P_K2 to the pressure chamber 38 and/or 78.

As an alternative to the above, a control pressure P_NORA can be conducted to the named pressure chambers 38 and/or 78 through the line 124, which is characteristic of operation in a non-emergency operation.

In the normal operation of the transmission, the self-operating pressure, retention valve 1 and the activation valve 2 find themselves in that position, shown in FIG. 8, so that the activation pressure P_A can actually, by way of the pressure chamber 70 of the self-operating pressure, retention valve 1 and the line 14 to the pressure chamber 72 of the activation valve 2, the forwarding of which is, however, blocked by the position of the control slide valve 29 of the activation valve 2. On this account, in normal operation, the two clutch activation apparatuses 4, 40 are simultaneously at rest or are alternatively activated.

In a case of a disturbance, for example, of the transmission control apparatus, the electrically controlled clutch control valves 48, 49 do not function. On this account, the control slide valves, respectively, 127 or 128 of these two clutch control valves close the pressure chambers 125 or 126, so that no clutch control pressure P_K1 or P_K2 can be transmitted through the switch-over valve 54 to the pressure chambers 38 and/or 78 of the self-operating pressure, retention valve 1 as well as of the activation valve 2.

Alternatively or in addition to the above, in such an emergency operation, the possibly operating control pressure P_NORA is not operative or at least very much reduced, so that the control slide valve 29 of the clutch activation valve 2 will be driven by the force of the reset spring 32 in the direction of the pressure chamber 78. Thereby, in a case of a sufficiently higher motor or transmission output speed of rotation, the speed of rotation control pressure P_D at the self-pressure pressure, retention valve 1 takes care that the slide valve 30 thereof when, in the shown position of FIG. 8, remains unchanged and the activation pressure P_A is communicated to pressure chambers 110, 111 by way of the pressure chamber 70, the line 14 and the now mutually connected pressure chambers 72 and 73, through a line 119.

In a case of normal operation, the clutch activation apparatus 4 is in its activated state and the clutch activation pressure P_K1 therein, which was delivered from the first clutch, control valve 48, is then conducted through the first conversion valve 52, subsequently through the line 118 to reach a pressure chamber 108 of the selection valve 51, then is free to invest that location, where the pressure chamber 108 is placed in the neighborhood of one of the two end faces of a control slide valve 50.

The clutch activation pressure P_K2 can indeed be transferred from the second clutch, control valve 49 through the conversion valve 53 and the line 120 to a pressure chamber 113 on the exactly oppositely disposed end face of the control slide valve 50 of the selection valve 51 since, in this depicted embodiment, the clutch activation arrangement 40 was finally not activated, whereby the control slide valve 50, as shown in FIG. 8, stands in the depicted shifting position.

In this emergency operation shifting position of the selection valve 51, the activation pressure P_A, emitted by the pressure chamber 110 through a pressure chamber 109 and a line 117 to pressure chambers 129, 130 of the first conversion valve 52. Since the pressure chamber 129 is placed in the neighborhood of that end face, which is remote from the reset spring of a control slide valve 135, then the activation pressure P_A, which has been hereto introduced, pushes the control slide valve 135 against the force of a reset spring 137, so that pressure chambers 130, 131 at the conversion valve 52 become combined. Thereby, the activation pressure P_A becomes available in this emergency operation to the first clutch, activation apparatus 4 through the line 118. This is then held by the now present pressure P_A in its engaged position, until the speed of rotation related control pressure P_D at the self-operating pressure, retention valve 1 drops below the predetermined pressure threshold.

Under a circumstance, wherein the second clutch, activation valve 49, during the normal operation of the transmission was finally active in an emergency operation which follows that the control slide valve 50 of the selection valve 51, because of the clutch activation pressure P_K2, which was formerly active through the line 120 to pressurize the pressure chamber 113 now stands in a shifting position, in which the activation pressure P_A from the pressure chamber 111 can free the path of the pressure into a pressure chamber 112 on the selection valve 51. By way of a line 121, this activation pressure P_A then is open to a pressure chamber 132 as well as to a pressure chamber 133 of the second conversion valve 53.

Thereby in the emergency operation, no clutch activation pressure P_K2 is in force at the second conversion valve 53, a control slide valve 136 is pushed against the force of a reset spring 138, so that pressure chambers 133, 134 of the second conversion valve 53 are pressure-wise, bound together. In this way, the activation pressure P_A is communicated to the cylinder 5 of the second clutch, activation apparatus 40 by way of the pressure line 120. This apparatus will be held with the activation pressure P_A in its engaged position until the speed of rotation related control pressure P_D at the self-operating pressure, retention valve 1 drops below the predetermined threshold pressure value.

Finally, with the aid of the FIGS. 9 and 10, the explanation is made clear, that the self-operating pressure, retention valve 1 can be extended into further self-operating pressure, retention valve valves 55, 56, wherein three slide pistons 139, 140, 147 are designed for and mounted on the control slide valve 30. In the case of the embodiments, it is immaterial as to whether the pilot pressure P_VST or another pressure, such as the control pressure which characterizes normal operation of the transmission, is delivered to the pressure chamber 38, which is placed in the area of the end face, which is remote from the reset spring of the control slide valve 30.

Further, the activation pressure P_A is routed to the self-operating pressure, retention valve 55 or 56, at the pressure chamber 70, by way of the line 14 to the activation valve 2 (not shown). Now, the attachment of line 14 to the self-operating pressure, retention valve 55 or 56, as usual, is done by way of the additional pressure chamber 143, which is contiguous to the pressure chamber 70.

In the case of the embodiment example according to FIG. 9 and FIG. 10, provision is further made in that the speed of rotation related control pressure P_D is directed to two pressure chambers 58 and 59, which are so placed that each, according to the set position of the control piston 139, which is remote from the reset spring or the control piston 140, which is proximal to reset springs 141, 142, can be subjected to this speed of rotation related pressure P_D, which is activation-effective.

In the case of the embodiment example according to FIG. 10, there has been additionally provided in the retention valve 56 for the enhancement of the constructive features of the self-operating pressure, retention valve 55 (as indicated in FIG. 9), the advantage that the already mentioned reverse travel prevention pressure P_RV can also be directed to pressure chamber 62 which contains the reset spring 142 and that the conveyance of the speed of rotation control pressure P_D can be sent to the pressure chamber 59 by way of a one-way valve 57.

By way of the last mentioned measure, assurance is given that the reverse travel prevention pressure P_RV cannot act upon the pressure chamber 58 and again, the assurance is provided in that, in a case of purposeful reverse travel in the emergency operation, the clutch, which up to that time has been engaged, is disengaged and thus the forward drive of the vehicle is interrupted for safety reasons.

The control valve arrangements presented up to this point carry the advantage that the lubrication of a wet start clutch during the slipping normal operation of the transmission is an assured matter. Such a slip-operation is, however, terminated when the start clutch is engaged. This condition is forcefully retained during the emergency operations by way of the presented control valve arrangements, so that no special measures for the lubrication of the clutch need be given consideration.

In this connection, provision can also be made that the activation pressure P_A in the description of the invention is then taken from that specific supply of hydraulic pressure fluid, which during the normal operation, is used for the slip operation of at least one start clutch.

REFERENCE NUMERALS

1 self-operating, retention valve (maintains given pressure)
2 activation valve
3 clutch regulation valve
4 clutch activation apparatus
5 cylinder
6 clutch piston
7 reset spring
8 line, pilot pressure
9 line, pilot pressure
10 line, pilot pressure
11 line, pressure regulated by speed of rotation
12 line to retention valve 1
13 line, reverse travel prevention pressure
14 connection line, retention valve-activation valve
15 connection line, activation valve, clutch regulation valve
16 conn. Line, clutch regulation-valve-clutch activation apparatus
17 conn. Line, clutch regulation valve-clutch activation apparatus
18 line, pressure source
19 reset-spring loaded control slide valve in clutch regulation valve
20 control piston on control slide valve in retention valve
21 control piston on control slide valve in retention valve 22 control piston on control slide valve in retention valve
23 control piston on control slide valve in activation valve
24 control piston on control slide valve in activation valve
25 control piston on control slide valve in clutch regulation valve
26 control piston on control slide valve in clutch regulation valve
27 control piston on control slide valve in clutch regulation valve
28 control piston on control slide valve in clutch regulation valve
29 control slide valve in activation valve
30 control slide valve in self-operating pressure, retention valve
31 reset spring in self-operating, retention valve
32 reset spring in activation valve
33 reset spring in clutch regulation valve
34 shorter control slide valve in clutch regulation valve
35 axial section on shorter slider of the clutch regulation valve
36 valve boring of the self-operating, retention valve
37 solenoid operated clutch regulation valve
38 pressure chamber at the self-operating, retention valve
39 pressure chamber at the self-operating, retention valve
40 clutch activation apparatus
41 clutch regulation valve
42 selection valve
43 switch-over valve
44 control slide valve in selection valve
45 line P_VST1
46 line P_VST1
47 selection valve
48 solenoid operated clutch regulation valve
49 solenoid operated clutch regulation valve
50 control slide valve at selection valve
51 selection valve
52 proportional flow solenoid valve (conversion of pressure)
53 proportional flow solenoid valve (conversion of pressure)
54 switch-over valve
55 self-operating pressure, retention valve
56 self-operating pressure, retention valve
57 one way block valve
58 pressure chamber for RPM dependent control pressure
59 pressure chamber for RPM dependent control pressure
60 line P_VST2
61 line P_VST2
62 pressure chamber for reverse travel prevention pressure
63 boring for control slide valve in the activation valve
64 boring for long control slide valve in the clutch regulation valve
65 boring for short control slide valve in the clutch regulation valve
66 line for exchange valve-self-operating pressure, retention valve
67 line for exchange valve-activation valve
68 line for selection valve-clutch regulation valve
69 control piston on the selection valve
70 pressure chamber on the self-operating pressure, retention valve
71 pressure chamber on the self-operating pressure, retention valve
72 pressure chamber on the activation valve
73 pressure chamber on the activation valve
74 pressure chamber on the first clutch regulation valve
75 pressure chamber on the clutch regulation valve
76 pressure chamber on the clutch regulation valve
77 pressure chamber on the clutch regulation valve
78 pressure chamber on the activation valve
79 pressure chamber on the activation valve
80 pressure chamber on the clutch regulation valve
81 pressure chamber on the selection valve
82 pressure chamber on the selection valve
83 pressure chamber on the selection valve
84 pressure chamber on the selection valve
85 pressure chamber on the selection valve
86 control piston on the selection valve
87 pressure chamber on the second clutch regulation valve
88 pressure chamber on the second clutch regulation valve
89 pressure chamber on the second clutch regulation valve
90 longer control slide valve on the second clutch regulation valve
91 pressure chamber on the second clutch regulation valve
92 shorter control slide valve
93 line
94 line
95 line
96 line: selection valve to second clutch regulation valve
97 reset spring on the selection valve
98 line: selection valve to the second clutch regulation valve
99 control piston on the selection valve
100 line
101 line
102 pressure chamber on activation valve
103 pressure chamber on activation valve
104 line for pressure P_NS
105 pressure chamber on second clutch regulation valve
106 line
107 line
108 pressure chamber on selection valve 51
109 pressure chamber on selection valve 51
110 pressure chamber on selection valve 51
111 pressure chamber on selection valve 51
112 pressure chamber on selection valve 51
113 pressure chamber on selection valve 51
114 line
115 line
116 line
117 line
118 line
119 line
120 line
121 line
122 line
123 line
124 line
125 pressure chamber on clutch regulation valve 49
126 pressure chamber on clutch regulation valve 48
127 control slide valve on clutch regulation valve 49
128 control slide valve on clutch regulation valve 48
129 pressure chamber on conversion valve 52
130 pressure chamber on conversion valve 52
131 pressure chamber on conversion valve 52
132 pressure chamber on conversion valve 52
133 pressure chamber on conversion valve 52
134 pressure chamber on conversion valve 52
135 control slide valve on conversion valve 52
136 control slide valve on conversion valve 53
137 reset spring
138 reset spring
139 control piston
140 control piston
141 reset spring
142 reset spring
143 pressure chamber on self-operating pressure, retention valve 144 electrical control cable
145 electrical control cable
146 electrical control cable
147 control piston
P_A activation pressure
P_D speed of rotation dependent control pressure
P_K clutch activation pressure
P_K1 clutch activation pressure
P_K2 clutch activation pressure
P_NOR normal operational characterizing control pressure
P_NORA normal operational characterizing control pressure
P_NS emergency operational pressure
P_RV reverse travel prevention pressure
S electrical pre-signal
P_V1 supply pressure
P_V2 supply pressure
P_VST pilot pressure
P_VST1 pilot pressure
P_VST2 pilot pressure

The invention claimed is:

1. A control valve arrangement for controlling a start clutch of an automatic transmission, the control valve arrangement comprising a clutch control valve (3, 37, 41, 48, 49) for controlling at least one clutch activation apparatus (4, 40), during normal operation of the transmission, depending one of a pilot pressure (P_VST, P_VST1, P_VST2) and an electric pilot signal (S), and the clutch control valve (3, 37, 41, 48, 49) converting a supply pressure (P_V1, P_V2) into a clutch activation pressure (P_K, P_K1, P_K2) enabling control of the clutch activation apparatus (4, 40);

an emergency operation of the transmission being initiated by a failure of a pilot pressure (P_VST, P_VST1, P_VST2) which is due to a failure of at least one of an electric pilot signal (S), a motor rotational speed, a transmission input revolution speed, a transmission output revolution speed, a motor torque and a transmission torque, with consideration given to an extent of vehicle travel;

an activation pressure (P_A), during the emergency operation of the transmission, being exerted upon one of the clutch control valve (3, 37 41, 48, 49) or directly upon the clutch activation apparatus (4, 40) such that the clutch activation apparatus (4, 40) is maintained in a closed position, until at least one of the motor output rotational speed and the transmission output rotational speed is respectively less than a predetermined threshold speed;

the clutch control valve (3, 41), which is controlled by the pilot pressure (P_VST, P_VST1, P_VST2), comprises a short slide valve and an axially aligned long slide valve, a first face of the short slide valve (34, 92), remote from a reset spring (33), is subjected to the activation pressure (P_A), a second face of the short slide valve (34, 92) and a first face of the long slide valve (19, 90), remote from the reset spring (33) and axially adjacent the second face of the short slide valve (34, 39), both being subjected to the pilot pressure (P_VST, P_VST1, P_VST2), and a second face of the long slide valve (19, 90) communicating with and is biased by the reset spring.

2. The control valve arrangement according to claim 1, wherein an activation valve (2) directs the activation pressure (P_A) from a self-operating pressure, retention valve (1) to one of the clutch control valve (3, 37, 41, 48, 49) and the clutch activation apparatus (4, 40), if a speed of rotation control pressure (P_D) at the self-operating pressure, retention valve (1) is greater than a pressure threshold.

3. The control valve arrangement according to claim 2, wherein the pressure threshold designates the motor rotational speed below which the motor will stall.

4. The control valve arrangement according to claim 1, wherein the pilot control pressure (P_VST, P_VST1, P_VST2) acts on the self-operating pressure, retention valve (1) and the activation valve (2) during normal operation of the transmission.

5. The control valve arrangement according to claim 1, wherein the self-operating pressure, retention valve (1) and the activation valve (2), convey a normal operation control pressure (P_NOR) during normal operation of the transmission.

6. The control valve arrangement according to claim 1, wherein the activation valve (2) conveys an emergency operation control pressure (P_NS) during emergency operation of the transmission.

7. The control valve arrangement according to claim 1, wherein a slide valve (29) of the activation valve (2) receives the activation pressure (P_A) and the pilot pressure (P_VST).

8. The control valve arrangement according to claim 1, wherein the slide valve (30) of the self-operating pressure, retention valve (1) receives the activation pressure (P_A) and the pilot pressure (P_VST).

9. The control valve arrangement according to claim 1, wherein each of the slide valve (29, 30) of the self-operating pressure, retention valve (1) and the activation valve (2) have, on a first axial end, a first control piston (20, 24), each of which is biased by a reset spring, and on a second axial end, a second control piston (22, 23), each of which is biased by the pilot pressure (P_VST).

10. The control valve arrangement according to claim 1, wherein an end face of the long slide valve (19) of the clutch control valve (3, 41) is adjacently opposed to an end face of the short slide valve (34) of the clutch control valve (3, 41), each end face being in communication with and controlled by the pilot pressure (P_VST).

11. The control valve arrangement according to claim 10, wherein the long slide valve (19) of the clutch control valve (3, 41) is biased by the pilot pressure (P_VST) at a first end and biased by a reset spring (33) at a second end.

12. The control valve arrangement according to claim 10, wherein a reset spring (33) communicates with a piston (28) of the long slide valve (19) of the clutch control valve (3, 41), both end faces of the piston (28) of the long slide valve (19) of the clutch control valve (3, 41) are subjected to the clutch activation pressure (P_K, P_K1, P_K2).

13. The control valve arrangement according to claim 1, wherein the clutch activation apparatus (4, 40) has a helical reset spring (7) within a cylinder (5), which spirally encircles a guided piston (6), the helical reset spring (7) providing a restorative force for the clutch activation apparatus (4, 41).

14. The control valve arrangement according to claim 1, wherein the supply pressure (P_V1, P_V2), which is delivered to the clutch control valve (3, 41), is essentially equivalent to the activation pressure (P_A).

15. The control valve arrangement according to claim 1, wherein the pilot pressure (P_VST) is conveyed to both the first end face of the long control side valve (19), remote from the reset spring (31), and to the oppositely situated second end face of the shorter slide valve (34, 92) of the clutch control valve (3, 41), and a self-operating pressure, retention valve (1) and an activation valve (2) each respectively have first ends, remote from reset springs (31, 32), subjected to a control pressure (P_NOR), which is characteristic of normal operation, the activation pressure (P_A), during a failure of the control pressure (P_NOR) which leads to the emergency operation of the transmission, is relayed to the clutch control valve (3, 41) such that the clutch activation apparatus (4, 40), following the failure of the pilot pressure (P_VST), will remain in the closed position, until the speed of rotation related control pressure (P_D) at the self-operating pressure, retention valve (1) falls below a predetermined threshold pressure value.

16. The control valve arrangement according to claim 1, wherein the pilot pressure (P_VST) is conveyed to both a first end face, remote from a reset spring, of the slide valve (30) of the self-operating pressure, retention valve (1) and to the first face of the longer slide valve (19) of the clutch control valve (3) such that an axial end face, remote from a reset spring, of a slide valve (29) of an activation valve (2), and a pressure chamber (72) of the activation valve (2) is subject to the activation pressure (P_A);
- a control pressure (P_NS) is conveyed to an end face of the slide valve (29) of the activation valve (2) which communicates with the reset spring to establish the emergency operation of the transmission;
- the activation pressure (P_A) from the activation valve (2) is conveyed to the clutch control valve (3), following the failure of the pilot pressure (P_VST) such that the clutch activation apparatus (4) remains in the closed position until the speed of rotation control pressure (P_D) falls below a predetermined threshold pressure value.

17. The control valve arrangement according to claim 1, wherein a first pilot pressure (P_VST1) is directed to the first end face of the long slide valve (19) of the first clutch control valve (3) and a second pilot pressure (P_VST2) is directed to a second end face, remote from a reset spring, of a spring loaded slide valve (90) of a second clutch control valve (41), and
- the first clutch control valve (3) of a first clutch activation apparatuses (4) and the second clutch control valve (41) of a second clutch activation apparatus (40) each respectively apply a first and a second clutch activation pressure (P_K1, P_K2) to the first and the second clutch activation apparatuses (4, 40);
- a first and a second pilot pressure (P_VST1, P_VST2) are delivered to a switch-over valve (43), a higher of the first and the second pilot pressures (P_VST1, P_VST2) is conveyed, in an alternating manner to an end face, remote from a reset spring, of a control slide valve (29, 30) of a activation valve (2) and to an end, remote from a reset spring, of a self-operating pressure, retention valve (1);
- the activation pressure (P_A) is directed, upon failure of the first and the second pilot pressures (P_VST1, P_VST2) and when a speed of rotation related control pressure (P_D) at the self-operating pressure, retention valve (1), from the self-operating pressure, retention valve (1) to a selection valve (42) by the activation valve (2), such that, with respect to an operative positioning of the selection valve (42), the activation pressure (P_A) is directed to one of the first end face of the shorter slide valve (34) of the first clutch control valve (3) and on end face, remote from the reset spring, of the slide valve (90) of the second clutch activation valve (41), such that the first clutch activation apparatus (4) remains in a closed position, until the speed of rotation related control pressure (P_D) directed to the self-operating pressure, retention valve (1), falls below a predetermined pressure threshold, while the second clutch activation apparatus (41) is one of retained in or guided to a closed position.

18. The control valve arrangement according to claim 17, wherein the end surface, remote from the reset spring, of the slide valve (44) of the selection valve (42) is pressure loaded by the controlled clutch activation pressure (P_K1) of the first clutch control valve (3), such that, if the controlled clutch activation pressure (P_K1) falls below a predetermined pressure threshold value, the slide valve (44) of the selection valve (42) is brought axially into a second operative position, in which, for the realization of emergency operation, the activation pressure (P_A) from this selection valve (42) is conducted to the end face, remote from the reset spring, of the shorter slide valve (92) of the second clutch control valve (41), such that the second clutch control valve (41) acting upon the end face, remote from the reset spring, of the spring loaded control slide valve (92) of this same valve, forwards a supply pressure (P_V2), to serving as a clutch activation pressure (P_K2), to initiate emergency operation displacement at the second clutch activation apparatus (40) for the closure of the same.

19. The control valve arrangement according to claim 1, wherein a first pilot pressure (P_VST1) can be conveyed to the first end face, remote from the reset spring, of a spring loaded slide valve (19) of a first clutch control valve (3) and a second pilot pressure (P_VST2) can be conveyed to the end face remote from the reset spring, of a spring loaded slide valve (90) of a second clutch control valve (41), and
- the two clutch control valves (3, 41) are each respectively subject to the pressure from two clutch activation apparatuses (4, 40) respectively with, one clutch activation pressure (P_K1, P_K2);
- the first and the second pilot control pressures (P_VST1, P_VST2) are conducted to a switch-over valve (43), by way of which the end face, remote from the reset spring, of the control slide valve (29) of the activation valve (2), is alternately subjected to the higher of the two pilot pressures (P_VSWT1 and P_VST2) and
- a speed of rotation related control pressure (P_D) is sent to a slide valve (30) of the self-operating pressure, retention valve (1);
- following a failure of the first and the second pilot pressures (P_VST1, P_VST2) and in the presence of a predetermined, rotation speed relative, control pressure (P_D) on the self-operational pressure retention valve (1), the activation pressure (P_A) from the self-operating pressure, retention valve (1) is forwarded by way of the activation valve (2) to a reset spring lacking selection valve (47) and by way of which, forwarded further with consideration given to a state of the operative position of the activation valve (P_A) onto one of the end face, which is remote from the reset spring, of the shorter control slide valve (34) of the first clutch control valve (3) and onto the end face, which is remote from the reset spring, of the shorter control slide valve (92) of the second clutch control valve (41); and
- an first end surface of the slide valve (44) in the selection valve (47) is pressurized with the controlled clutch activation pressure (P_K1) of the first control valve (3) and a second end surface of the slide valve (44), adjacent the reset spring are pressurized with the controlled clutch activation pressure (P_K2) of the second clutch control valve (41), such that, in a case of the failure of the first and the second pilot pressures (P_VST1, P_VST2), the first clutch activation apparatus (4), which was one of immediately previously in the closed position and the second clutch activation apparatus (41) in the same state, would remain in the closed state until the speed of rotation related control pressure (P_D) at the self-operating pressure, retention valve (1) falls below the predetermined pressure threshold value.

20. The control valve arrangement according to claim 1, wherein the clutch control valve is a controllable, proportional, solenoid valve (37) with two end faces, which are, respectively, remote from reset springs of slide valves (29, 30) of a activation valve (2) and the self-operating pressure, retention valve (1) are pressure loaded by a characterizing pressure (P_NOR) during normal operation; and the clutch activation pressure (P_K), during normal operation, is delivered without hindrance from the clutch control valve (37), by way of the activation valve (2) to the clutch activation apparatus (4);

the pressure retention valve (1) is subjected to pressure by the speed of rotation control pressure (P_D), whereby, following failure of a solenoid, clutch control valve (37) and a defection of the control pressure (P_NOR) which is characteristic of normal operation, for realization of emergency operation, an activation pressure (P_A) from the self-operating pressure, retention valve (1) is applied to the clutch activation apparatus (4) through the activation valve (2), by way of which the clutch activation apparatus (4) remains in the closed position until the speed of rotation control pressure (P_D) at the self-operating pressure, retention valve (1) falls below a predetermined threshold value of pressure.

21. The control valve arrangement according to claim 1, wherein the clutch control valve is designed as a solenoid, controllable, proportional valve (37);

end faces, remote from reset springs, of slide valve (29, 30) of an activation valve (2) and a self-operating pressure, retention valve (1) are applied with pressure during normal operation with the controlled clutch activation pressure (P_K) from the solenoid clutch control valve (37);

the clutch activation pressure (P_K), emanating during normal operation from the clutch activation valve (37), is forwarded, without hindrance, by way of the activation valve (2) to the clutch activation apparatus (4);

the self-operating pressure, retention valve (1) is applied with pressure from the speed of rotation related control pressure (P_D);

an emergency pressure (P_NS), for initiating the emergency operation of the transmission, is conveyed to the end face, remote from the reset spring, of the slide valve (29) of the activation valve (2), whereby, after failure of the solenoid clutch control valve (37), the activation pressure (P_A) from the self-operating pressure, retention valve (1) is shifted to the clutch activation apparatus (4) by way of the activation valve (2), whereby, at that time, the clutch activation apparatus (4) is held in a closed position until the speed of rotation related control pressure (P_D) at the self-operating pressure, retention valve (1) falls below a predetermined, threshold pressure value.

22. The control valve arrangement according to claim 1, wherein two, solenoid energized clutch control valves (48, 49) for activating two clutch activation apparatuses (4, 40), one self-operating pressure, retention valve (1), one activation valve (2), one selection valve (51) one variant self-operating pressure, retention valve (55) and two conversion valves (52, 53), during the normal operation of the transmission a greater of the controlled clutch activation pressures (P_K1, P_K2) of the two clutch control valves (48, 49), acting through an exchange valve (54), applies pressure upon an end face, remote from a reset spring, of a slide valve (29, 30) of at least one of the self-operating pressure, retention valve (1) and the activation valve (2);

the controlled clutch activation pressure (P_K1) of the one clutch control valve (48), by way of a first conversion valve (52) is conveyed to a first clutch activation apparatus (4) and to an end face of a slide valve (50) on the selection valve (51), further, the controlled clutch activation pressure (P_K2) of the second clutch control valve (49), by way of a second conversion valve (53) is conveyed to a second clutch activation apparatus (40) and to a second end face of the slide valve (50) on the selection valve (51), while, if the two solenoid clutch control valves (48, 49) fail, the emergency operation of the transmission is assured by a speed of rotation related control pressure (P_D), which so acts, when exceeding a predetermined threshold pressure value on the self-operating pressure, retention valve (1), that an activation pressure (P_A) can be conducted from the self-operating pressure, retention valve (1) to the selection valve (51) through the activation valve (2), in the case of which, the activation pressure (P_A) is conducted from the selection valve (51) to one of two conversion valves (52, 53), and the conversion valves (52, 53) can bring about an operative position, that the activation pressure (P_A) is sent directly to the appropriate clutch activation apparatus (4, 40), such that the involved clutch activation apparatus (4, 40) remains in a closed position until the speed of rotation control pressure (P_D) at the self-operating pressure, retention valve (1) falls below the predetermined threshold pressure.

23. The control valve arrangement according to claim 22, wherein the selection valve (51), during the emergency operation of the transmission, that whichever of the two clutch activation apparatuses (4, 40) was last in closure, is held in the closed position.

24. The control valve arrangement according to claim 23, wherein a control pressure (P_NORA), which characterizes normal operation of the transmission, is conveyed to end faces, remote from associated reset springs, of the slide valves (29, 30) of the self-operating pressure, retention valve (1) and activation valve (2).

25. The control valve arrangement according to claim 1, wherein the speed of rotation related control pressure (P_D) is directed to two, discrete pressure chambers (58, 59) of the self-operating pressure, retention valve (55), which said chambers, by way of at least one control piston (139, 140) of the assigned slide valve (30) are so separated.

26. The control valve arrangement according to claim 1, wherein the activation pressure (P_A) is taken from a pressurized hydraulic fluid source, which is employed during the normal operation of the slip operation of the at least one start clutch.

* * * * *